United States Patent
Buschman et al.

(10) Patent No.: US 11,608,988 B2
(45) Date of Patent: *Mar. 21, 2023

(54) STEAM GENERATING SYSTEM

(71) Applicant: WHIRLPOOL CORPORATION, Benton Harbor, MI (US)

(72) Inventors: Jessica Buschman, St. Joseph, MI (US); Alessandro Gigante, Cassinetta (IT); Jurij Paderno, Novate Milanese (IT); Massimiliano Frontini, Casciago (IT); Massimiliano Daniele, Cassinetta (IT); Luca Minetto, Fossalta di Piave (IT); Alberto Castiglioni, Porto Valtravaglia (IT); Edoardo Gallenzi, Trecate (IT)

(73) Assignee: Whirlpool Corporation, Benton Harbor, MI (US)

( * ) Notice: Subject to any disclaimer, the term of this patent is extended or adjusted under 35 U.S.C. 154(b) by 894 days.

This patent is subject to a terminal disclaimer.

(21) Appl. No.: 16/377,825

(22) Filed: Apr. 8, 2019

(65) Prior Publication Data

US 2019/0309956 A1    Oct. 10, 2019

Related U.S. Application Data

(60) Provisional application No. 62/654,877, filed on Apr. 9, 2018.

(51) Int. Cl.
  *F24C 13/00*    (2006.01)
  *F24C 15/32*    (2006.01)
  *A47J 27/04*    (2006.01)

(52) U.S. Cl.
  CPC .............. *F24C 13/00* (2013.01); *F24C 15/32* (2013.01); *F24C 15/327* (2013.01); *A47J 2027/043* (2013.01)

(58) Field of Classification Search
  CPC .. A47J 2027/043; A47J 37/0664; A47J 27/04; F24C 13/00; F24C 15/32;
  (Continued)

(56) References Cited

U.S. PATENT DOCUMENTS 7,045,745 B2   5/2006  Kim
7,323,662 B2   1/2008  Cho et al.
(Continued)

FOREIGN PATENT DOCUMENTS

FR       2958727 A1   10/2011
WO    2018048255 A1    3/2018

*Primary Examiner* — Tu B Hoang
*Assistant Examiner* — Bonita Khlok
(74) *Attorney, Agent, or Firm* — Price Heneveld LLP

(57) ABSTRACT

A steam generating system for an appliance includes a first tank positioned at a first vertical position and having an upper water outlet and a lower water outlet. A second tank is positioned at a second vertical position that is lower than the first vertical position of the first tank. A first and second interconnecting members respectively connect the upper and lower water outlets of the first tank to the second tank. Together, the first and second interconnecting members fluidically connect the first and second tanks. A valve assembly is positioned along the second interconnecting member to selectively provide access to the second tank from the first tank. Inlet and outlet pumps are respectively coupled to the first and second tanks to supply and discharge water from the steam generating system. The appliance further includes a retractable hose for connecting the steam generating system to a water source.

7 Claims, 34 Drawing Sheets

(58) Field of Classification Search
CPC .... F24C 15/327; F24C 14/005; F24C 15/003; F24C 7/085; F24C 7/081–088; A21B 3/04; A21B 1/24; A23L 5/13; F22B 1/28–288; F24H 1/12; F24H 1/122
USPC .......................... 219/401, 682, 731; 126/20
See application file for complete search history.

(56) References Cited

U.S. PATENT DOCUMENTS

| | | |
|---|---|---|
| 8,863,654 B2 | 10/2014 | Asami et al. |
| 8,997,638 B2 | 4/2015 | Park et al. |
| 9,565,963 B2 | 2/2017 | Joen et al. |
| 9,565,964 B2 | 2/2017 | Yang et al. |
| 9,581,339 B2 | 2/2017 | Yang et al. |
| 2010/0154656 A1* | 6/2010 | Yamamoto ............ F24C 15/327 99/467 |
| 2012/0199015 A1 | 8/2012 | Seguchi et al. |
| 2013/0087107 A1* | 4/2013 | Zhang ...................... F16T 1/00 122/491 |
| 2014/0097173 A1* | 4/2014 | Becker .................... A47J 27/04 126/369 |
| 2015/0253002 A1 | 9/2015 | Shibuya et al. |
| 2016/0061490 A1 | 3/2016 | Cho et al. |
| 2016/0374499 A1* | 12/2016 | Donarski .............. F24C 15/327 392/397 |
| 2018/0070596 A1 | 3/2018 | Kim et al. |

\* cited by examiner

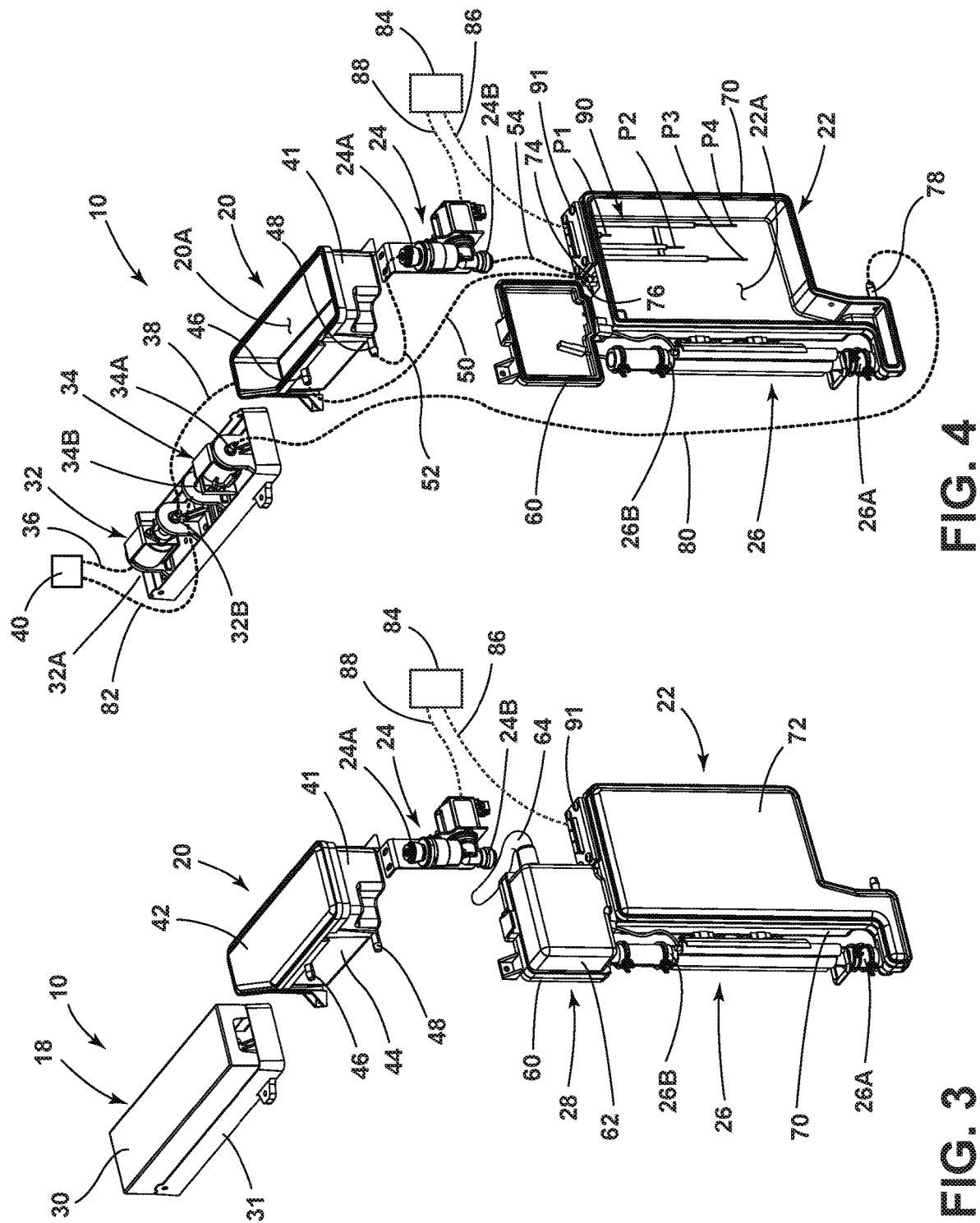

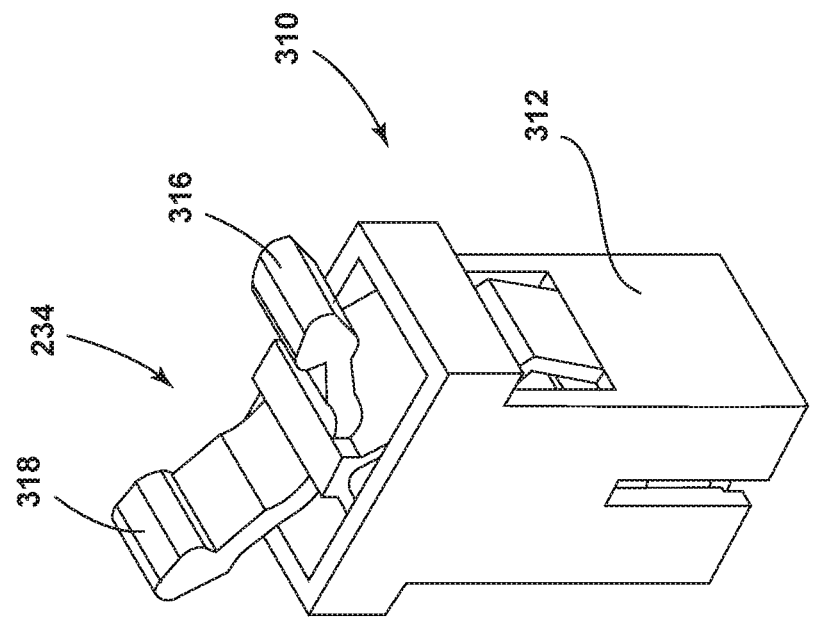
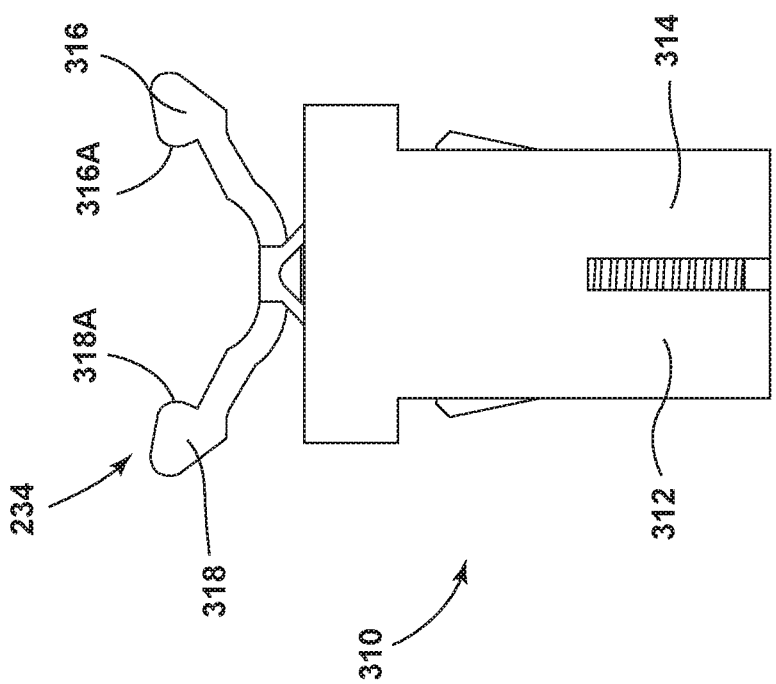
FIG. 20A
FIG. 20B

STEAM GENERATING SYSTEM

CROSS-REFERENCE TO RELATED APPLICATION

This application claims priority to and the benefit under 35 U.S.C. § 119(e) of U.S. Provisional Patent Application No. 62/654,877, filed on Apr. 9, 2018, entitled STEAM GENERATING SYSTEM, the entire disclosure of which is hereby incorporated herein by reference.

BACKGROUND

The present device generally relates to an oven having a steam generating system, and more specifically, to an oven having a steam generating system that is not plumbed, but rather uses an inlet system to fill water tanks disposed on the oven chassis.

SUMMARY

In at least one aspect, a steam generating system for an oven includes a first tank positioned at a first vertical position and having an upper water outlet and a lower water outlet. A second tank is positioned at a second vertical position that is lower than the first vertical position of the first tank. A first hose is coupled to the upper water outlet of the first tank and further coupled to a first inlet of the second tank. A second hose is coupled to the lower water outlet of the first tank and further coupled to a second water inlet of the second tank. A valve assembly is positioned along the second hose and operable between open and closed conditions. An inlet pump is coupled to the first tank and an outlet pump is coupled to the second tank to provide and discharge water from the system. A boiler is coupled between the second tank and a phase separator, and a water connecting system coupled to the inlet pump to introduce water to the system.

In another aspect, a steam generating system for an appliance includes a first tank positioned at a first vertical position. The first tank includes an upper water outlet and a lower water outlet vertically offset from one another. A second tank is positioned at a second vertical position that is lower than the first vertical position of the first tank. The upper water outlet of the first tank that is fluidically coupled to the second tank by a first interconnecting member. The lower water outlet of the first tank is fluidically coupled to the second tank by a second interconnecting member. A valve assembly is disposed along the second interconnecting member and is operable between open and closed conditions to selectively provide access between the first tank and the second tank via the second interconnecting member.

In another aspect, an appliance includes a chassis having an upper wall and a rear wall. A cooking cavity is at least partially surrounded by the chassis. A first tank is mounted on the upper wall of the chassis and includes an upper water outlet and a lower water outlet. A second tank is mounted on the rear wall of the chassis in a position that is vertically lower than a position of the first tank. The second tank includes first and second water inlets. The upper water outlet of the first tank is fluidically coupled to the first water inlet of the second tank. The lower water outlet of the first tank is fluidically coupled to the second water inlet of the second tank.

In yet another aspect, a steam generating system for an appliance includes a first tank disposed at a first vertical position. The first tank includes a cavity with a first water outlet and a second water outlet. The second water outlet is positioned vertically below the first water outlet. A valve assembly is operable between open and closed conditions. A second tank is positioned at a second vertical position that is lower than the first vertical position of the first tank. The second tank includes first and second water inlets. The first water outlet of the first tank is fluidically coupled to the first water inlet of the second tank. The second water outlet of the first tank is fluidically coupled to the valve assembly that is further fluidically coupled to the second water inlet of the second tank.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 3 is a rear top perspective view of components of the steam generating system of FIG. 2 as removed from the oven;

FIG. 4 is a rear top perspective view of the components of FIG. 3 showing interconnections between the components;

FIG. 20A is a side elevation view of a push-push connector device;

FIG. 20B is a top perspective view of the push-push connector device of FIG. 20A;

DETAILED DESCRIPTION OF EMBODIMENTS

Figure 1:
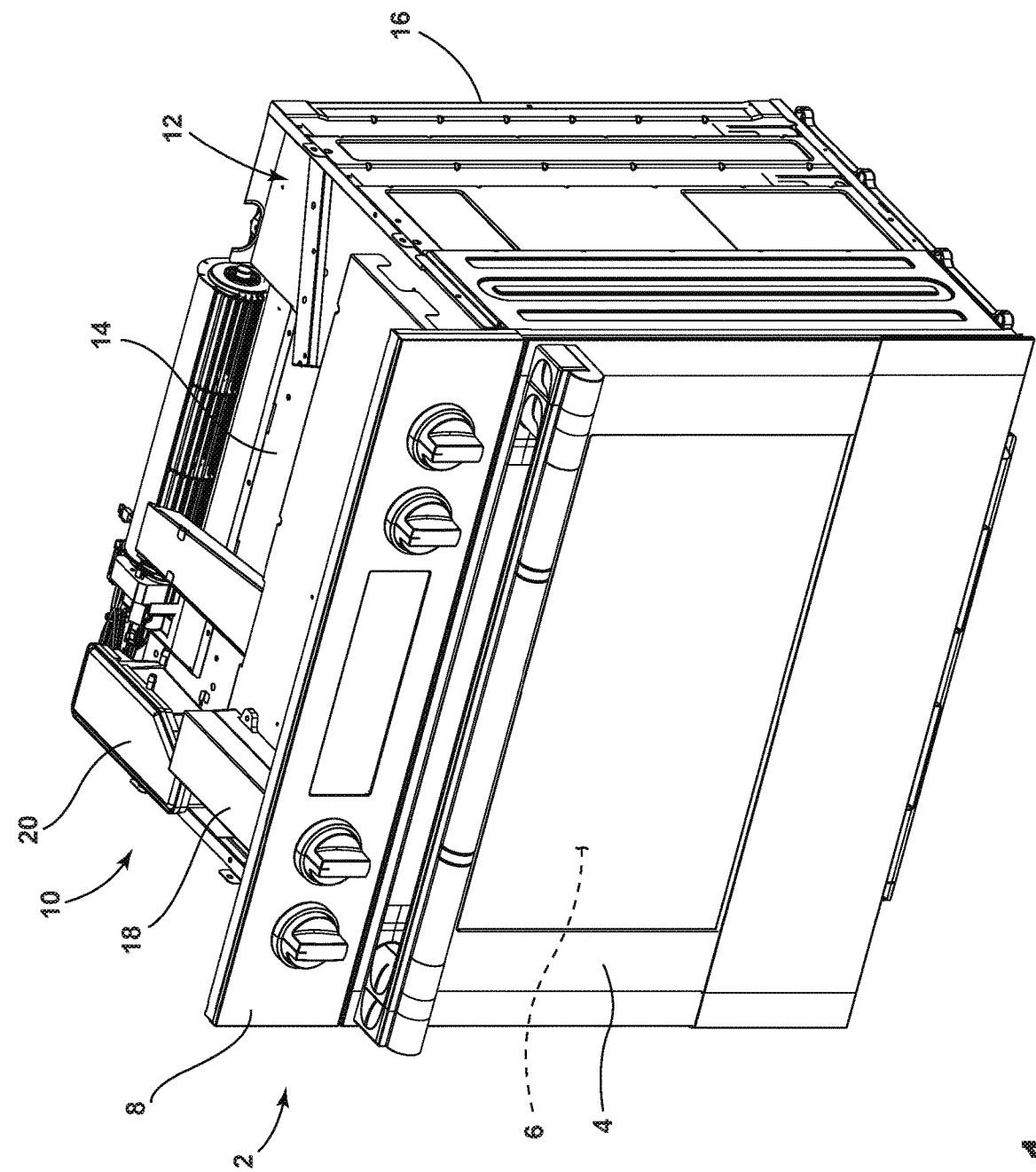
FIG. 1 is a front top perspective view of an oven having a steam generating system according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, an oven 2 includes a door 4 which selectively provides access to a cooking cavity 6. The oven 2 is shown as having a user interface panel 8 disposed above the oven door 4 for allowing a user to control the parameters of a cooking procedure. The oven 2 further includes a steam generating system 10 which is disposed on a chassis 12 of the oven 2 that surrounds, or partially surrounds, the cooking cavity 6. In this way, the steam generating system 10 is disposed outside of the cooking cavity 6 along various portions of the chassis 12, yet in communication with the cooking cavity 6 to provide steam thereto during a steam cooking procedure. The chassis 12 includes an upper wall 14 and a rear wall 16. Components of the steam generating system 10 are contemplated to be disposed along the upper wall 14 and rear wall 16 of the chassis 12, however, it is further contemplated that the components of the steam generating system 10 may be located along any portion of the oven 2 outside of the cooking cavity 6. On the upper wall 14, a pump housing 18 is shown containing one or more pumps, as further described below. An upper tank 20 is also disposed on the upper wall 14 of the chassis 12 and is configured to receive water for use in a steam generating procedure, as further described below. While an oven is shown in FIG. 1 and used throughout this disclosure, an oven is only an exemplary appliance upon which the steam generating system 10 can be used. Other appliances contemplated for use with the present concept may include a toaster oven, a microwave, a slow cooker, or any other appliance that may include a steam generating feature.

Figure 2:
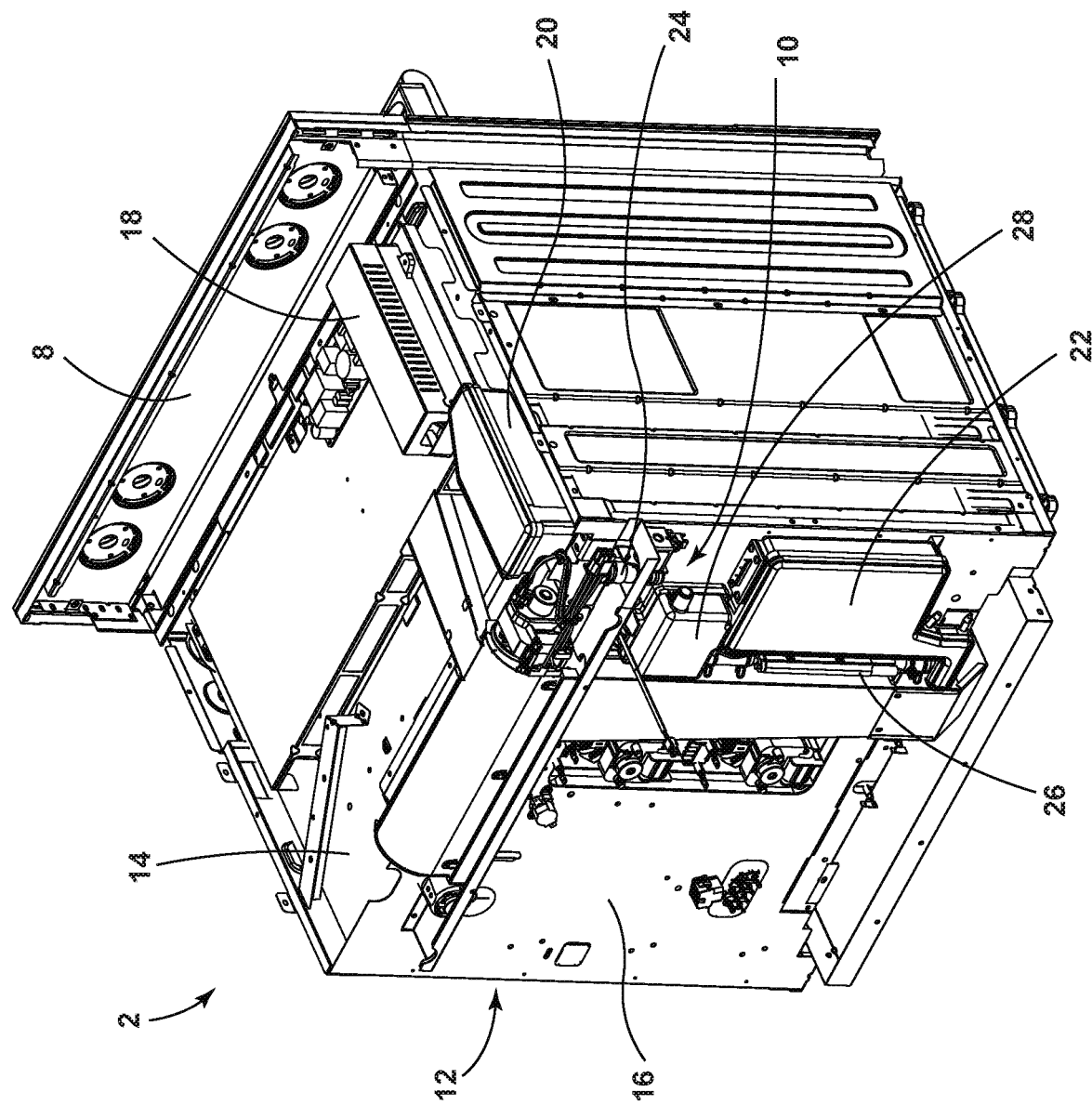
FIG. 2 is a rear top perspective view of the oven of FIG. 1.

Referring now to FIG. 2, the rear wall 16 of the chassis 12 is shown having a lower tank 22 disposed thereon which is fluidically coupled to the upper tank 20 for the transfer of water therebetween, as further described below. The lower tank 22 is coupled to the rear wall 16 of the chassis 12 at a vertical position that is lower than a vertical position of the upper tank 20. In this way, water can be gravitationally fed from the upper tank 20 to the lower tank 22 using the conduits disposed therebetween. A valve assembly 24 is shown coupled to the rear wall 16 of the chassis 12 and is contemplated to be an electrovalve assembly configured to selectively control the introduction of water from the upper tank 20 into the lower tank 22, as further described below. Thus, the steam generating system 10 includes a two-tank or dual-tank system having the upper tank 20 and the lower tank 22, wherein the upper tank 20 is further connected to a water inlet system, as further described below. The upper tank 20 is contemplated to be a completely sealed tank to avoid any water overflow to the chassis 12 or any steam traveling up from the lower tank 22 to the upper tank 20 and then to the chassis 12. Similarly, the lower tank 22 is a sealed tank that is operably coupled to the cooking cavity 6 (FIG. 1). In this way, both the upper tank 20 and the lower tank 22 are void of openings to the chassis 12 thereby increasing the efficiency of the steam generating system 10 and reducing the risk of condensation or water spillage on electrical components disposed on the chassis 12.

As further shown in FIG. 2, a boiler 26 is positioned in communication with the lower tank 22 at a first end thereof, and in communication with a phase separator 28 at a second end thereof. In use, the boiler 26 is contemplated to include a heating element used to heat water provided from the lower tank 22. Heating the water provides a water and steam mixture which is introduced into the phase separator 28 from the boiler 26. The phase separator 28 is configured in fluid communication with the boiler 26, the lower tank 22, and the cooking cavity 6 (FIG. 1). The water and steam mixture provided from the boiler 26 is separated at the phase separator 28 into steam, which is directed toward the cooking cavity 6 during a steam cooking procedure, and water, which is directed toward the lower tank 22 for re-entry into the steam generating procedure.

Referring now to FIGS. 3 and 4, the steam generating system 10 is shown as removed from the chassis 12 to better identify the individual components and the interconnections between those components. In FIG. 3, the pump housing 18 is shown having a base 31 and a cover 30 that may be pivotally coupled to the base to cover two pumps 32, 34 shown in FIG. 4. The pumps 32, 34, are enclosed within the pump housing 18 to reduce noise and protect the electronics from possible water leakage. The pumps 32, 34 are fluidically coupled to hoses and interconnecting members and are used for supplying water and discharging water to and from the steam generating system 10. In the configuration shown in FIG. 4, it is contemplated that pump 32 is used to provide water to the upper tank 20, and may be referred to herein as a supply pump or inlet pump. The pump 32 includes an inlet 32A and an outlet 32B, wherein the inlet 32A is coupled to a water connecting system 40 by an interconnecting hose 36. The water outlet 32B is coupled to the upper tank 20 by an interconnecting hose 38. Similarly, the pump 34 is contemplated to remove or discharge water from the steam generating system 10 and includes an inlet 34A and an outlet 34B, wherein the inlet 34A is coupled to the lower tank 22 and the outlet 34B is coupled to the water connecting system 40. The pump 34 may be referred to herein as a discharge pump or an outlet pump. In this way, the water connecting system 40 is coupled to both the supply pump 32 and the discharge pump 34 for allowing a user to both supply and discharge water to and from the steam generating system 10 at a single location. The water connecting system 40 may take various forms that are further described below.

With further reference to FIGS. 3 and 4, the upper tank 20 includes a base 41 and a cover 42 (FIG. 3). The cover 42 is removed in FIG. 4 to reveal a cavity 20A of the upper tank 20 defined by the base 41. The cavity 20A of the upper tank 20 is filled via the supply pump 32 as interconnected to the upper tank 20 via interconnecting hose 38. As shown in FIG. 3, the upper tank 20 includes a side wall 44 having an upper water outlet 46 and a lower water outlet 48 that are vertically offset from one another. It is contemplated that the upper and lower water outlets 46, 48 may be positioned on other side walls than side wall 44 of the upper tank 20 without departing from the spirit of the present concept. The upper and lower water outlets 46, 48 are positioned at different vertical positions on the side wall 44 of the upper tank 20 to allow for controlled filling of the lower tank 22 from the upper tank 20. Filling of the lower tank 22 from the upper tank 20, is further described below. As shown in FIG. 4, the upper water outlet 46 is interconnected to the lower tank 22 via an interconnecting hose 50. The lower water outlet 48 of the upper tank 20 is interconnected with a first side 24A of the electrovalve 24 via an interconnecting hose 52. The electrovalve 24 further includes a second side 24B which is interconnected to an upper portion of the lower tank 22 via an interconnecting hose 54. In FIGS. 3 and 4, the upper tank 20 is shown as a single tank, but may comprise multiple tanks that cooperate to define an upper tank system. Similarly, the lower tank 22 is shown as a single tank, but may comprise multiple tanks that cooperate to define a lower tank system. In a system having multiple upper tanks or multiple lower tanks, or both, the principle operation of the steam generating system remains the same, in that the upper tank system is to be positioned vertically above the lower tank system, and multiple separate connections between the upper and lower tank systems should be present. As such, the upper tank 20 is contemplated to be disposed at a first vertical position, while the lower tank 22 is disposed at a second vertical position that is lower than the first vertical position of the upper tank 20. As noted above, the position of the upper and lower tanks 20, 22 are generally disposed on the chassis 12 of the oven 2.

Figure 7:
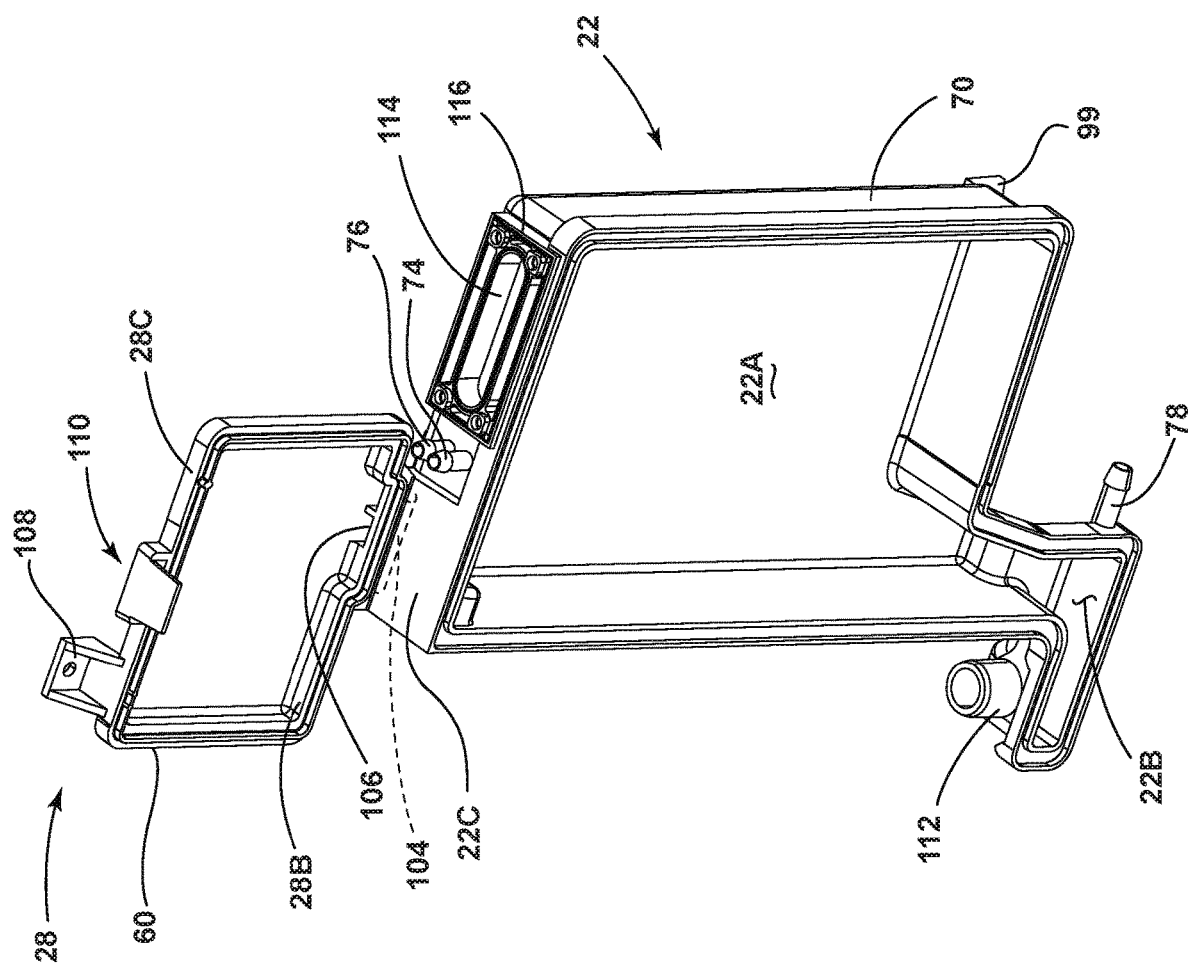
FIG. 7 is a top perspective view of portions of the phase separator and the lower tank of FIG. 6.

With further reference to FIG. 3, the phase separator 28 is shown having a base portion 60 and a cover portion 62. The phase separator 28 is contemplated to be connected to the cooking cavity 6 (FIG. 9) via an interconnecting steam supply tube 64. The steam supply tube 64 is contemplated to be comprised of a metallic material, such as a woven stainless steel, to ensure that the steam supply tube 64 can handle the increased temperatures of the cooking cavity 6 of the oven 2, even when a steam cooking feature is not being used. With further reference to FIGS. 3 and 4, the lower tank 22 is shown having a cover 72 disposed on a base portion 70 to define a cavity 22A therebetween. The base portion 70 includes water inlets 74, 76 (FIG. 4), disposed on an upper portion of the base portion 70. The water inlets 74, 76 may be referred to herein as first and second water inlets, respectively. Water inlet 74 interconnects with the electrovalve 24 via interconnecting hose 54. The water inlet 76 is best shown in FIG. 7 and is coupled to the upper tank 20 via interconnecting hose 50. There is no valve in place along interconnecting hose 50 between the upper and lower tanks 20, 22, such that interconnecting hose 50 is a continuously open member providing consistent access between the upper tank 20 and the lower tank 22. Thus, this connection between the upper tank 20 and the lower tank 22 is unencumbered for free fluidic communication between the tanks 20, 22. This direct and constantly open line between the tanks 20, 22 ensures the tanks 20, 22 are balanced with regards to air pressure during a steam generating cycle. The base portion 70 of the lower tank 22 further includes a water outlet 78 disposed at a lower-most portion of the lower tank 22 which is used to interconnect with the discharge pump 34 via interconnecting hose 80 which connects to the water inlet 34A of the discharge pump 34. The water outlet 34B of the discharge pump 34 is interconnected to the water connecting system 40 via interconnecting hose 82. During a water discharge cycle, outlet pump 34 will pump water out of the lower tank 22 and discharge the water through the water connecting system 40. Thus, the position of the water outlet 78 at the lower-most portion of the lower tank 22 ensures that all the water disposed in the lower tank 22 will be discharged during a water discharge cycle.

As further shown in FIGS. 3 and 4, the boiler 26 is coupled to the lower-most portion of the lower tank 22 at a first end 26A, and further coupled to the phase separator 28 at a second end 26B. The boiler 26 is an upright member positioned such that the second end 26B is disposed over the first end 26A, which provides for the phase separator 28 to be disposed over the second tank 22 in assembly. As further shown in FIG. 4, a water level sensor 90 is disposed within the lower tank 22 within the cavity 22A thereof and includes a plurality of sensors P1-P4 which are used to detect various water levels within the cavity 22A of the lower tank 22. In use, the boiler 26 is configured to heat water in the steam generating system 10 to convert the water into steam. In the embodiment shown in FIGS. 3 and 4, the boiler 26 is connected to the lower tank 22 and is in a vertical configuration having a height that is approximate the height of the lower tank 22. The boiler 26 is configured to deliver a steam and water mixture produced therein to the phase separator 28. The water level sensor 90 is configured to monitor water levels within the lower tank 22 during a filling cycle and a steam generating cycle of the steam generating system 10 to ensure that proper water levels are maintained.

With the upper tank 20 disposed at a higher vertical position then the lower tank 22, the present concept is able to provide a filling sequence which fills the upper and lower tanks 20, 22 sequentially and in a balanced manner with regards to water and air pressure within a sealed system. Other systems may incorporate pressure relief apertures in the tanks to stabilize pressures inside the system and ensure proper water flow inside the tanks and interconnecting hoses. These systems are often compromised when water level sensors fail or pumps fail in an "ON" position as floods to the oven chassis can occur causing electrical hazards. In the present system, the sealed upper and lower tanks 20, 22 are interconnected by the interconnecting hose 50 shown in FIG. 4 and the interconnecting hoses 52, 54 having the valve assembly 24 disposed therebetween. During a filling sequence, water is supplied from the inlet pump 32 from the water connecting system 40 and pumped into the cavity 20A of the upper tank 20.

Figure 5:
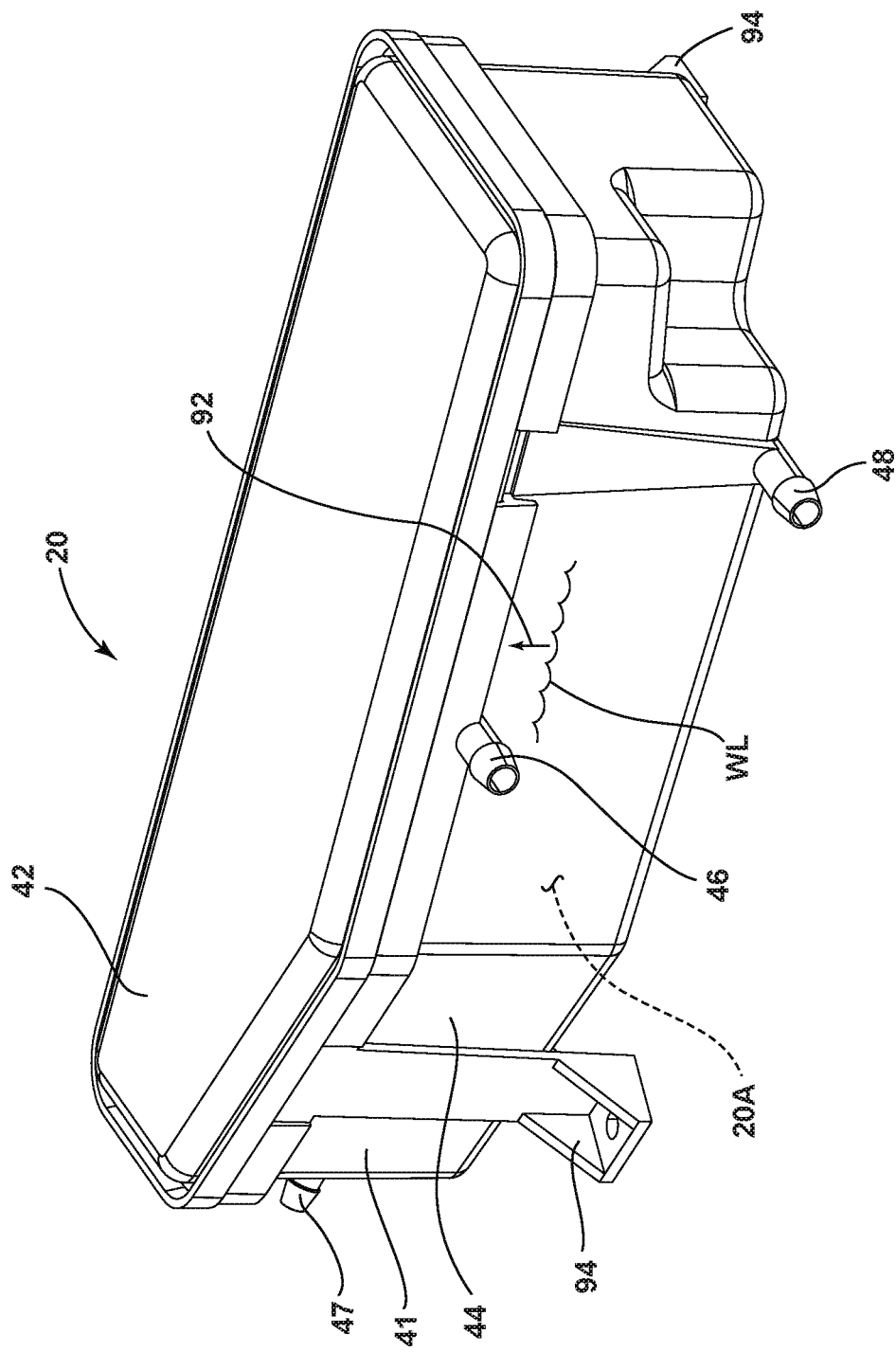
FIG. 5 is a top perspective view of an upper tank.

With reference to FIG. 5, the upper tank 20 may be filled via a water inlet 47 disposed on a front portion thereof. The various water inlets and outlets of the upper and lower tanks 20, 22 and other system components may be shared inlets and outlets that are used to both supply and discharge water from a system component using interconnecting hoses having multiple connections, as known in the art. Generally, inlet 47 is contemplated to be positioned at a vertical level on the upper tank 20 that is substantially the same as the vertical position of upper outlet 46. In FIG. 5, a water level WL is shown as rising in the direction as indicated by arrow 92 during a filling cycle. Thus, as water enters the upper tank 20 from inlet 47, as connected to inlet pump 32, the water level WL will rise within the cavity 20A so long as the valve assembly 24 is in a closed position. In the present system, it is contemplated that the valve assembly 24 will be closed during a system filling cycle. The filling cycle incorporates both the upper tank 20 and the lower tank 22. As the water level WL rises in the upper tank 20, the water level WL will eventually reach the upper outlet 46 when the valve assembly 24 is closed. As noted above, the upper water outlet 46 is interconnected to the water inlet 76 (FIG. 7) of the lower tank 22 via an interconnecting hose 50. Thus, as water rises to the upper water outlet 46, the overflow water will freely travel from the upper tank 20 to the lower tank 22 via the open line of interconnecting hose 50, as there is no valve assembly disposed along interconnecting hose 50 between the upper tank 20 and the lower tank 22. Thus, water is used to sequentially fill the upper tank 20 and the lower tank 22, wherein the lower tank 22 does not begin filling until the upper tank 20 is filled with the water level WL having reached the upper water outlet 46 of the upper tank 20. The inlet 47 and outlets 46, 48 of the upper tank 20 are shown in exemplary positions on the upper tank 20. It is contemplated that other positions for the inlet 47 and outlets 46, 48 can be used without departing from the spirit of the present concept. In general, inlet 47 and outlet 46 are positioned on an upper portion of the upper tank 20. Outlet 48 is positioned below outlet 46 and is generally disposed on a lower portion of the upper tank 20, such that the full volume of the cavity 20A (FIG. 4) of the upper tank 20 can be utilized to hold water at the onset of a steam cooking procedure.

As further shown in FIG. 5, the upper tank 20, includes a plurality of mounting brackets 94 that support the upper tank 20 in an up-right position and are used to fixedly couple the upper tank 20 to a portion of the chassis 12 (FIG. 1) of the oven 2, such as the upper wall 14. As positioned on an upper portion of the chassis 12, the upper tank 20 will gravitationally feed the overflow water from the upper tank 20 to the lower tank 22 through water outlet 46 via the open pathway of interconnecting hose 50 (FIG. 4) during a system filling sequence.

Figure 6:
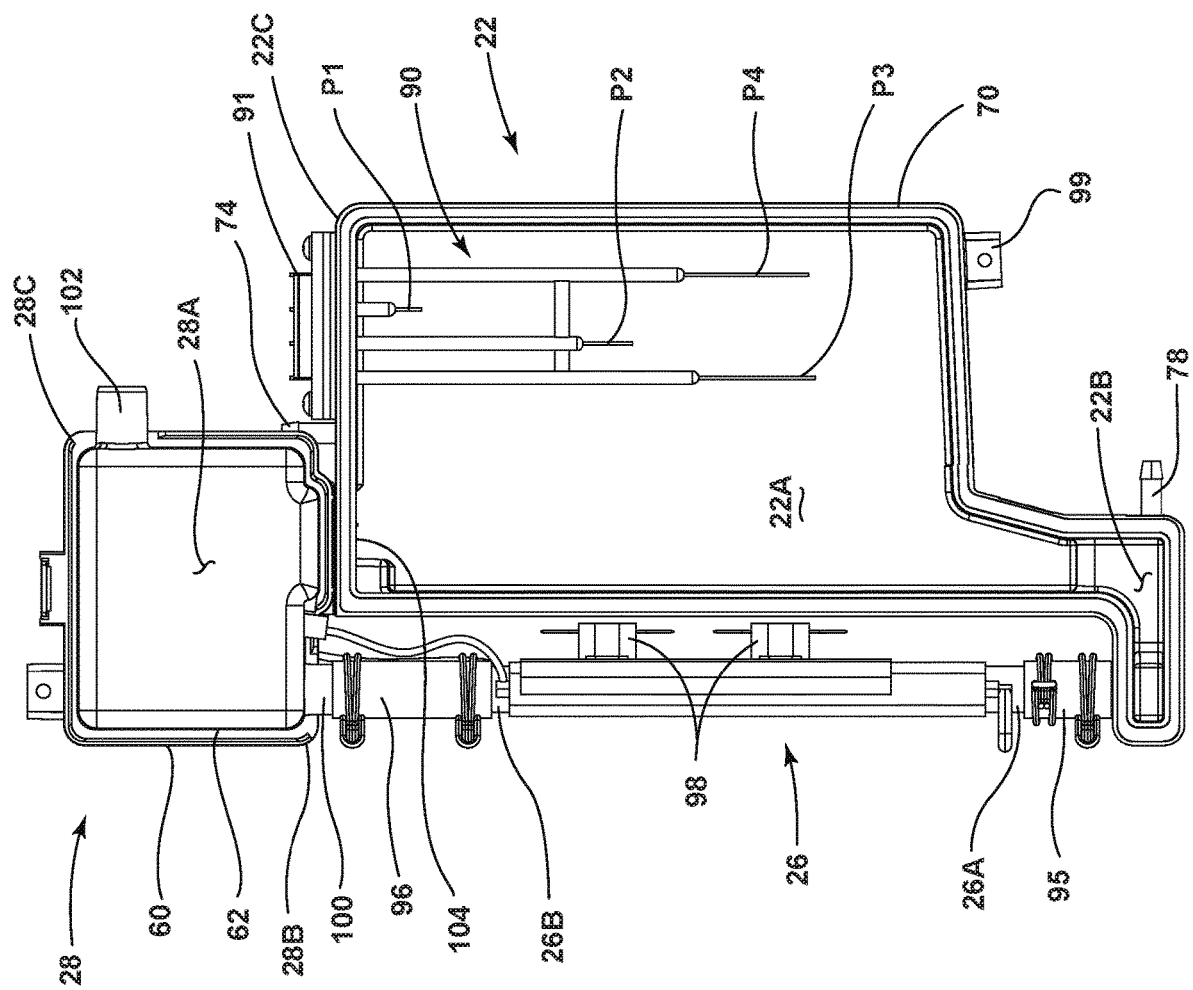
FIG. 6 is a rear perspective view of a lower tank, boiler and phase separator.

Referring now to FIG. 6, the lower tank 22 is shown with the cover 72 removed to reveal the cavity 22A having a lower-most portion 22B. Adjacent to the lower-most portion 22B of the cavity 22A, the water outlet 78 is disposed, which interconnects to the outlet pump 34 via interconnecting hose 80. In this way, the entire cavity 22A of the lower tank 22 can be emptied after a steam cooking procedure, as the lower tank 22 is designed to drain water towards the lower-most portion 22B in use. The lower-most portion 22B of the cavity 22A is coupled to the first end 26A of the boiler 26 via an interconnecting hose 95. The second end 26B of the boiler 26 is coupled to the phase separator 28 via an interconnecting hose 96. The boiler 26 further includes thermal limiters 98 to protect the boiler 26 from a potential overheating failure. The lower tank 22 includes one or more mounting brackets 99 that are used to couple the lower tank 22 securely to the chassis 12 of the oven 2 at a lower vertical position relative to the upper tank 20. In the embodiment shown in FIG. 2, the lower tank 22 is coupled to the rear wall 16 of the chassis 12 of the oven 2.

As further shown in FIG. 6, the water level sensor 90 extends into the cavity 22A of the lower tank 22. The water level sensor 90 includes an interface portion 91 that is externally accessible for connecting the water level sensor 90 to a power source or a controller, as further described below. The water level sensor 90 further includes multiple probes P1-P4 disposed at varying lengths and extending downwardly from the interface portion 91. The probes P1-P4 are configured to measure and monitor a water level within the cavity 22A of the lower tank 22 at various fill levels. The water level sensor 90 is coupled to an upper portion 22C of the lower tank 22, adjacent the water inlets 74, 76. As noted above, the water inlet 74 is contemplated to provide a connection between the upper tank 20 and the lower tank 22 through interconnecting hoses 52, 54 having the valve assembly 24 disposed therebetween. The valve assembly 24 (FIG. 4) is contemplated to be a valve assembly having open and closed conditions that are controlled in an electric manner, thereby making the valve assembly 24 an electrovalve. In the open condition, the valve assembly 24 allows for water to move freely from the upper tank 20 to the lower tank 22 through the interconnecting hoses 52, 54. Specifically, water stored in the upper tank 20 will exit the lower water outlet 48 (FIG. 5) and enter the lower tank 22 via water inlet 74, when the valve assembly 24 is in the open condition. In this way, the valve assembly 24 regulates the flow of water between the upper tank 20 and the lower tank 22. During the filling process, it is contemplated that the valve assembly 24 is closed, such that water is introduced into the cavity 22A of the lower tank 22 via water inlet 76 (FIG. 7). Once the upper tank 20 has been filled during a filling sequence, overflow water exits the upper tank 20 via upper water outlet 46. During a steam cooking process, the electrovalve 24 is contemplated to be selectively opened and closed as necessary to regulate a water level within the lower tank 22 as measured by the water level sensor 90. Thus, the water level sensor 90 and the valve assembly 24 are contemplated to be in communication with one another through an overall steam generating program that is contemplated to be controlled by a controller to control the amount of water available in the lower tank 22 during a steam cooking process using both the valve assembly 24 and the water level sensor 90. With reference to FIGS. 3 and 4, a controller 84 is shown operably coupled to the interface portion 91 of the water level sensor 90 via lead 86, such that data regarding a water level in the lower tank 22 can be electronically transmitted (or otherwise provided) to the controller 84 from the water level sensor 90. The controller 84 is further shown as being coupled to the valve assembly 24 via lead 88. In this way, the controller 84 is electronically coupled to and in communication with the valve assembly 24 and the water level sensor 90 for controlling the operations of the valve assembly 24 between open and closed conditions, as well as monitoring the water level within the lower tank 22. Thus, the controller 84 can open and close the valve assembly 24 based on water level data received from the water level sensor 90 when certain threshold water levels are detected by the water level sensor 90. It is further contemplated that the controller 84 is in communication with the user interface 8 of the oven 2 for controlling specific steam generating programs selected by a user. It is further contemplated that the controller 84 may be in communication with the inlet pump 32 and outlet pump 34 of the oven 2 for controlling specific filling sequences and draining sequences of the steam generating system 10.

With the interconnection of the lower tank 22 to the upper tank 20 via the unencumbered interconnecting hose 50 (with no valve disposed therebetween), the upper tank air pressure and lower tank air pressure can be kept at the same pressure level during a steam generating cycle so that water stored in the upper tank 20 can reach the lower tank 22 once the electrovalve 24 is opened without unwanted vacuum effects disrupting flow within the sealed system. With the multi-tank system having the upper tank 20 disposed at a vertical position that is above the lower tank 22, a water level sensor is not needed in the upper tank 20. This is unlike other systems which must monitor the water level in all tanks where apertures may be disposed in the tanks to relieve imbalanced pressure. In the present system, the sealed system between the upper tank 20 and the lower tank 22 provides for the lower tank 22 being the only tank that needs a water level sensor 90 to monitor water levels during filling and steam generating cycles, as the upper tank 20 is self-regulating via vertically offset outlets 46, 48.

With further reference to FIG. 6, the phase separator 28 is shown having the base portion 60 and the cover 62 coupled together to define a cavity 28A therebetween. The cover 62 of the phase separator 28 includes an inlet 100 and an outlet 102. The inlet 100 is configured to receive a water and steam mixture from the heated water of the boiler 26 during a steam generating cycle. The outlet 102 is positioned at a raised position relative to the inlet 100, such that steam produced by the boiler 26 rises toward the outlet 102 that is interconnected to the cooking cavity 6 via steam supply tube 64 (FIG. 3). As such, the outlet 102 may be referred to herein as a steam outlet 102. The lower tank 22 further includes a water inlet 104 that interconnects with a water outlet 106 of the phase separator 28 as best shown in FIG. 7. In FIG. 7, the cover 62 of the phase separator 28 has been removed to reveal the base portion 60 having a mounting bracket 108 used to couple the phase separator 28 to the chassis 12 of the oven 2. A clip mechanism 110 is used to couple the cover 62 (FIG. 6) to the base 60 of the phase separator 28. The base portion 60 includes the water outlet 106 to interconnect with water inlet 104 of the lower tank 22, such that water that is not converted into steam can re-enter in the lower tank 22 for further processing during a steam generating cycle. It is contemplated that the base portion 60 of the phase separator 28 and the base portion 70 of the lower tank 22 may be a unitary part.

As further shown in FIG. 7, the base portion 70 of the lower tank 22 includes a water outlet 112 that is an upwardly opening water outlet that is used to interconnect the lower tank 22 with the boiler 26. In FIG. 7, the upper portion 22C of the lower tank 22 is shown having an oblong aperture 114 surrounded by a mounting bracket 116 that is used to introduce and couple the water level sensor 90 to the lower tank 22. With the interconnections between the lower tank 22, the boiler 26 and the phase separator 28, a circulation of water during a steam generating cycle occurs between these interconnected components. In this way, water is not introduced directly into the cavity 6 of the oven 2, but rather water that is converted into steam enters the cooking cavity 6, while unconverted water is re-introduced into the cavity 22A of the lower tank 22. In FIG. 7, water inlet 76 is shown disposed on the upper portion 22C of the lower tank 22 and is configured to interconnect in an unobstructed fluidically free manner to the upper outlet 46 of the upper tank 20, via interconnecting hose 50 (FIG. 4). In this way, the cavity 22A of the lower tank 22 can fill once the water line WL (FIG. 5) of the upper tank 20 has reached the upper water outlet 46, thereby ensuring that the upper tank 20 is filled before the lower tank 22 is filled. Thus, water can be introduced into the lower tank 22 via water inlet 76 from the upper tank 20 during a filing cycle. Water can also be introduced into the lower tank 22 via water inlet 74 from the upper tank 20 during a valve regulated steam generating cycle. Further, water can be introduced into the lower tank 22 via water inlet 104 from the phase separator 28 during a steam generating cycle. The water inlets 74, 76 and 104 can be positioned at various locations on the lower tank 22, but are shown in the embodiment of FIG. 7 as being positioned on the upper portion 22C of the lower tank 22.

Figure 8:
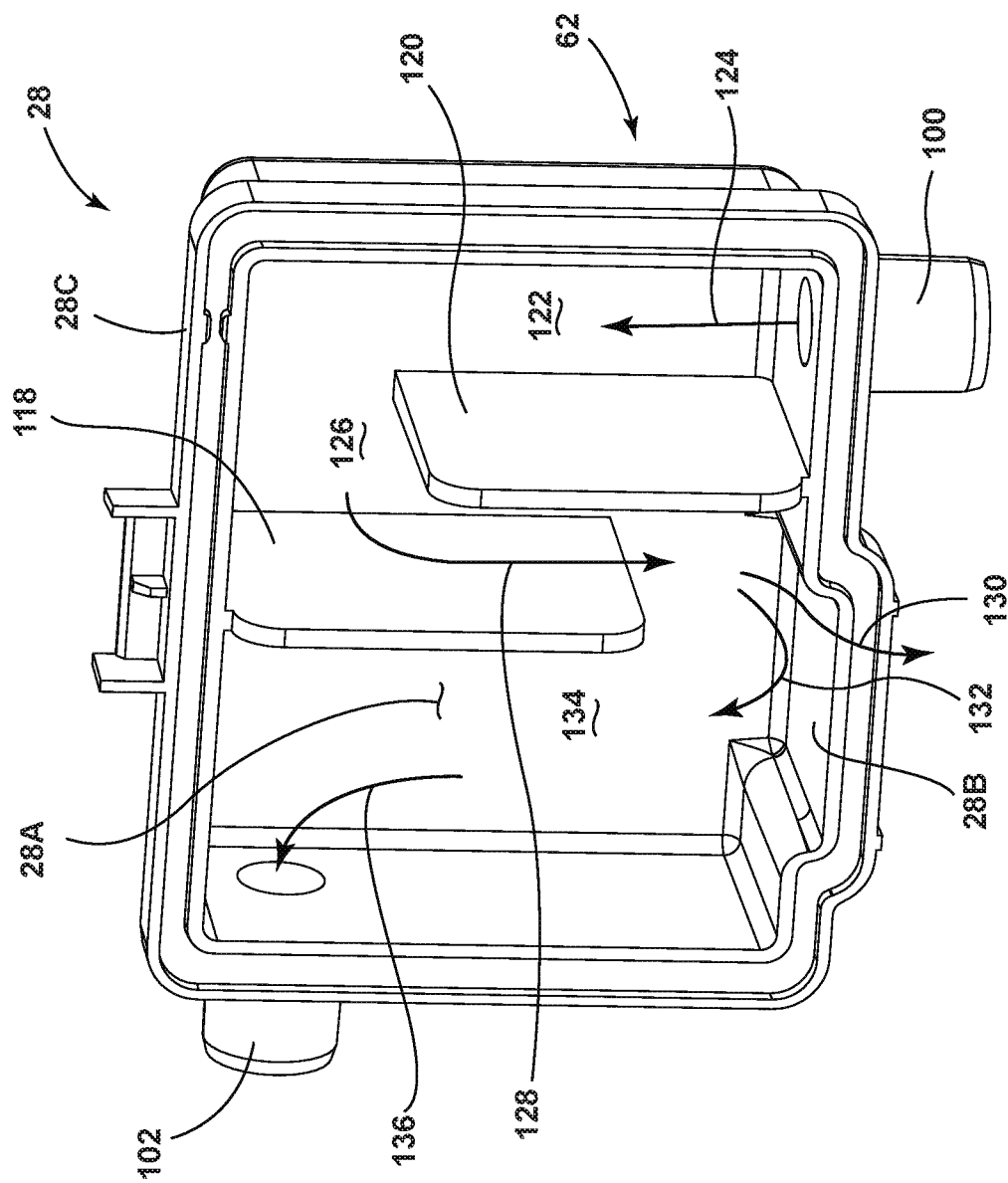
FIG. 8 is a top perspective view of a cover of the phase separator.
Figure 9:
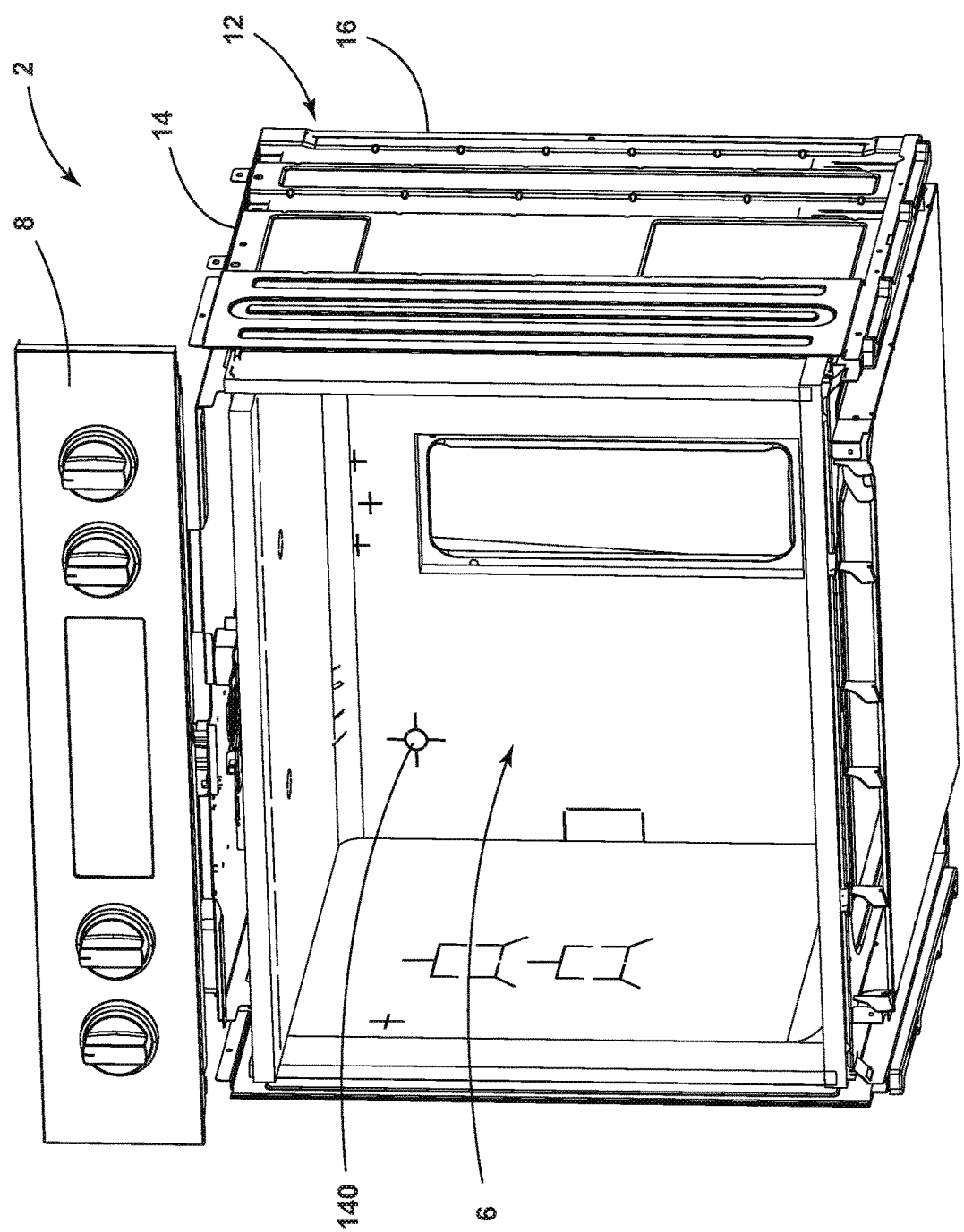
FIG. 9 is a bottom perspective view of the oven of FIG. 1 with the door removed to reveal a cooking cavity having a steam inlet.

Referring now to FIG. 8, the cavity 28A of the phase separator 28 is shown as generally defined by the cover 62 of the phase separator 28. Within the cavity 28A of the phase separator 28, upper and lower baffles 118 and 120 extend into the cavity 28A to separate the cavity 28A into multiple portions. A first portion 122 of the cavity 28A is configured to receive a water and steam mixture as introduced into the phase separator 28 from the boiler 26 in the direction as indicated by arrow 124. A second portion 126 of the cavity 28A provides for the water and steam mixture to move in a downward direction under the pressure of the steam as indicated by arrow 128. The movement of the water and steam mixture into the cavity 28A of the phase separator 28 in the direction as indicated by arrow 124 is a powered movement provided by the heating of the water within the boiler 26. Once the water and steam mixture has moved to the second portion 126 of the cavity 28A of the phase separator 28, the water and steam mixture will move downward in the direction as indicated by arrow 128, where the water that was not converted into steam will generally separate from the steam of the water and steam mixture and head toward the lower-most portion 28B of the phase separator 28 in the direction as indicated by arrow 130. The unconverted water can then exit the phase separator 28 via outlet 106 (FIG. 7) and be reintroduced into the cavity 22A of lower tank 22 for further processing. The separated steam will then rise in a third portion 134 of the cavity 28A of the phase separator 28, as indicated by arrow 132, towards the steam outlet 102 disposed on the upper portion 28C of the phase separator 28 and exit out of the phase separator 28 in the direction as indicated by arrow 136. Thus, as shown in FIG. 8, the directional arrows 124, 128, 132 and 136 define a pathway for steam, water, or both to travel through the phase separator 28. Inlet 100 of the phase separator 28 is disposed at a first end of the pathway, and outlet 102 of the phase separator 28 is disposed at a second end of the pathway. Water outlet 106 (FIG. 7) is disposed between inlet 100 and outlet 102 along the pathway where water separates from steam of the water and steam mixture to reenter lower tank 22. The elevated level of the steam outlet 102 helps to ensure that only steam, rather than any unconverted heated water, will enter the cooking cavity 6 during a steam cooking procedure. A steam inlet 140 is positioned within the cooking cavity 6 of the oven 2, as shown in FIG. 9. The steam inlet 140 is contemplated to be coupled to the steam supply tube 64 (FIG. 3) that is further coupled to the steam outlet 102 of the phase separator 28, thereby interconnecting the steam generating system 10 with the cooking cavity 6 to introduce steam thereto.

The connections between the tanks 20, 22, the pumps 32, 34, and the valve assembly 24 are described herein as being made via interconnecting hoses (such as interconnecting hoses 36, 38, 50, 52, 54, and 80 (FIG. 4)). These interconnections can be made with multiple hoses or tubes that are suitable for transporting water and generally define supply lines between system components. Thus, these interconnections define interconnecting members that may include multiple parts with suitable connectors, unless specifically noted otherwise. The interconnecting members are contemplated to be open members that provide for fluid transfers and air transfer between components, unless a valve assembly is disposed along such an interconnecting member. With a valve assembly in place on an interconnecting member, it is contemplated that the interconnecting member is then selectively open depending on a condition of the valve assembly.

Further, it is noted that multiple components of the steam generating system 10 (such as the upper tank 20, the lower tank 22, the phase separator 28 and others) include base portions and cover portions that interconnect to form whole components of the steam generating system 10. Such components can be unitary parts, and features disclosed herein as being disposed on either the base portions or cover portions of these components can also be disposed on the opposite portion (i.e. features described as being disposed on a base portion can be disposed on a cover portion and vice versa) without departing from the spirit of the present concept. Further, the upper and lower tanks 20, 22 may be referred to herein as first and second tanks of the multi-tank system.

It is contemplated that the capacity of the upper tank 20 and the lower tank 22 results in a combined volume of approximately 1 to 2 liters, such that the present concept provides a dual tank system that allows for a user to run a steam cooking function for a substantial length of time without the need to re-fill either of the upper or lower tanks 20, 22 during a steam generating cycle. Further, the steam generating system 10 of the present concept includes water inlet options at the water connecting system 40, such that a user does not need to stand in front of the oven 2 during a fill, drain or de-scaling operation. An external reservoir 180 (FIGS. 14A, 14B) can be used to provide water to the steam generating system 10 via the water connecting system 40. The external reservoir 180 can be placed on a rack within the oven cavity 6 (FIG. 14A), or can be placed on the door 4 of the oven 2 when the door 4 is opened (FIG. 14B) and then connected to the water connecting system 40 using appropriate supply lines. The various forms of the water connecting system 40 are described below and can be used to pump water into the steam generating system 10 from the external reservoir 180 using inlet pump 32, and can be used to pump water out of the steam generating system 10 into the external reservoir 180 using outlet pump 34.

Figure 10:
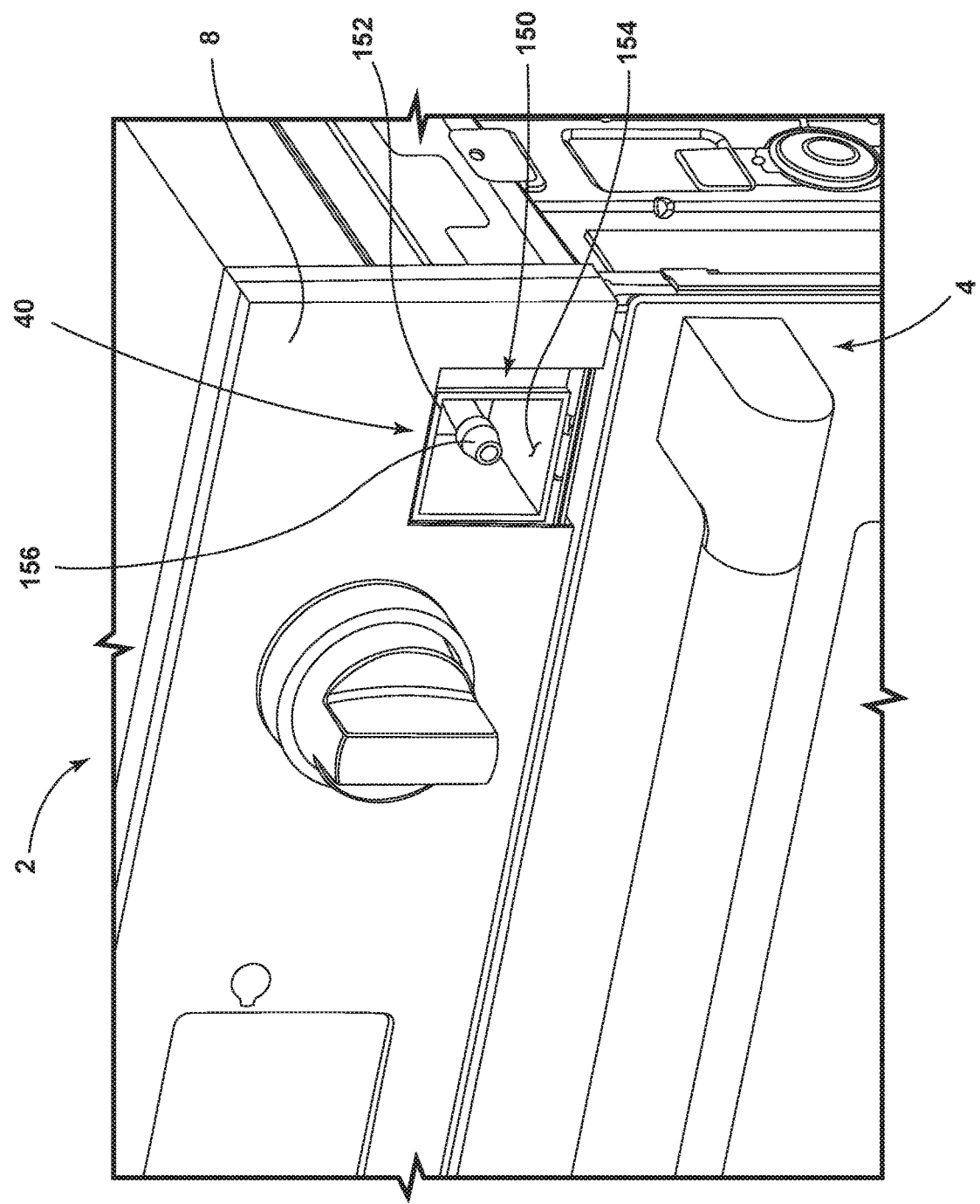
FIG. 10 is a front perspective view of the oven of FIG. 1 having a quick connect water inlet disposed thereon.

Referring now to FIG. 10, a water connecting system 40 may include a quick connect system 150. In the embodiment shown in FIG. 10, the quick connect system 150 is positioned on the user interface panel 8 above the door 4 of the oven 2. The position of the quick connect system 150 is exemplary only, and other positions are contemplated for use with the present concept. In the embodiment shown in FIG. 10, the quick connect system 150 includes a door 152 on the user interface panel 8 which is operable between open and closed positions to selectively provides access to an inset portion 154 of the user interface panel 8. A quick connect inlet stem 156 is positioned within the inset portion 154 of the quick connect system 150, such that the inlet stem 156 is accessible from an exterior portion of the oven 2. The quick connect inlet stem 156 may take various forms, as further described below. In use, it is contemplated that a user will open the door 152 to the inset portion 154 of the user interface panel 8 and connect a first end of an external hose 162 (FIG. 12A) to the quick connect inlet stem 156. A second end of the external hose 162 is contemplated to be a free end that will be placed into an external reservoir of water for introducing water into the steam generating system 10. Thus, it is contemplated that the quick connect inlet stem 156 is operably coupled to the inlet pump 32 via interconnecting hose 36 (FIG. 4) and is fixedly coupled to the inset portion 154 of the user interface panel 8.

Figure 11:
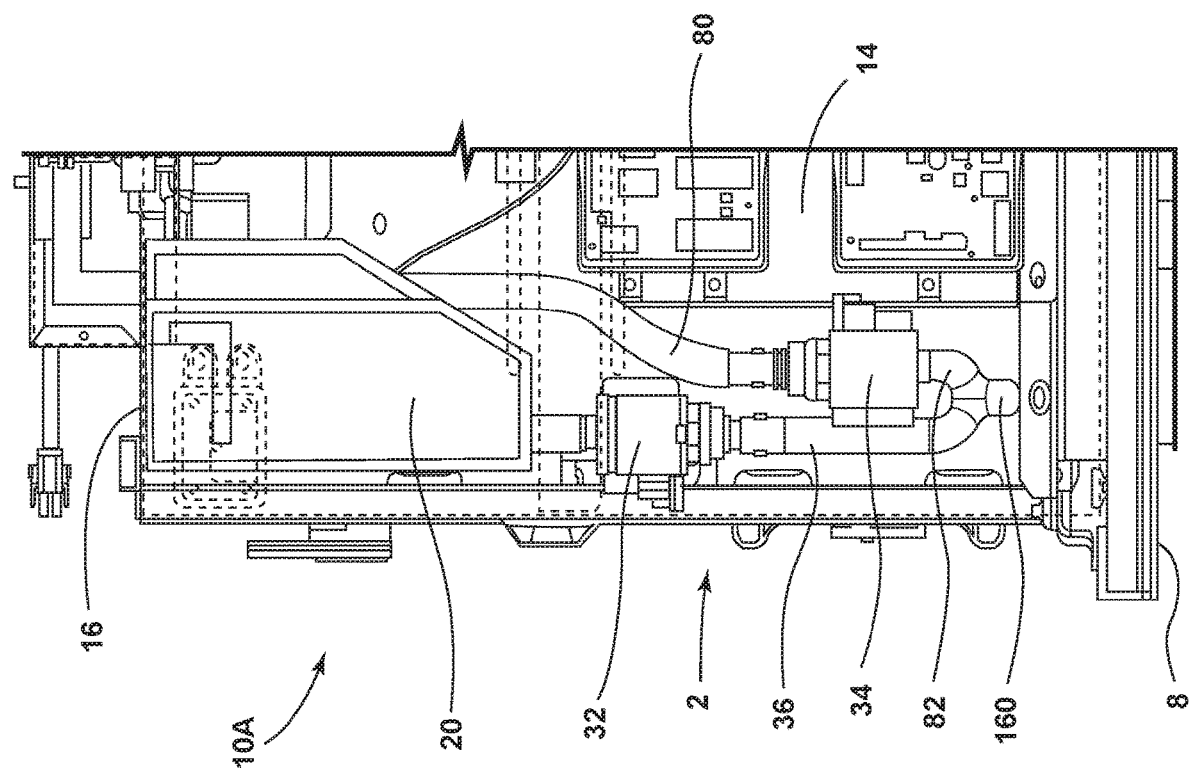
FIG. 11 is a partial top plan view of a steam generating system according to another embodiment disposed on an upper portion of a chassis.

Referring now to FIG. 11, another embodiment of the steam generating system 10A is shown having the inlet pump 32 and outlet pump 34 both connected to a common inlet and outlet hose 160 shown in the form of a "Y" connector. Interconnecting hoses 36, 82 are coupled to both pumps 32, 34, respectively, in a fluidic manner. In this way, the quick connect inlet stem 156 (FIG. 10) can connect with the common hose 160, such that water can be supplied to the steam generating system 10A via inlet pump 32, and water can also be discharged from the steam generating system 10A via outlet pump 34 through the water connecting system 40.

Figure 12A:
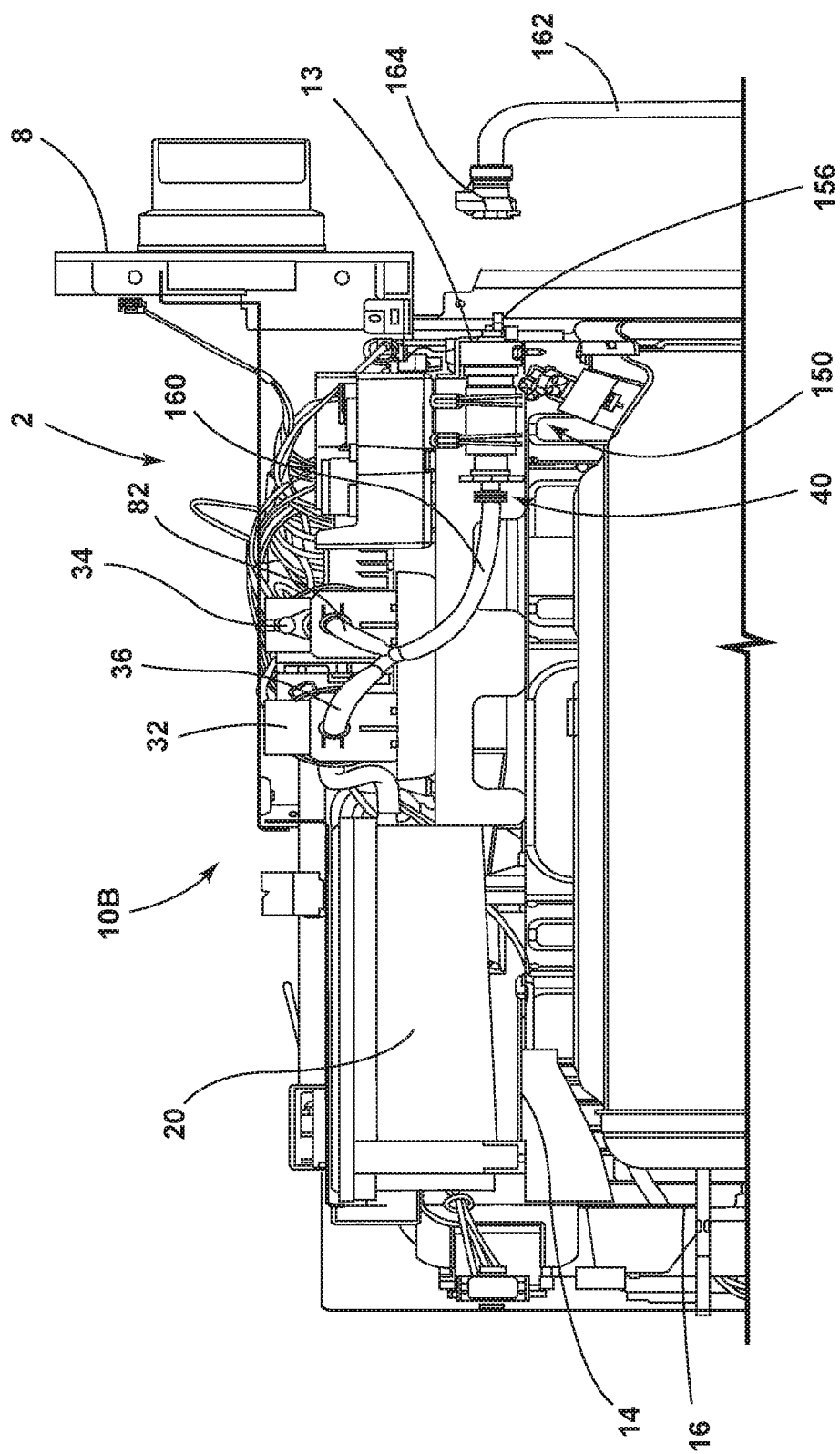
FIG. 12A is a side elevational view a steam generating system according to another embodiment of the present concept with a quick connect water inlet system.
Figure 12B:
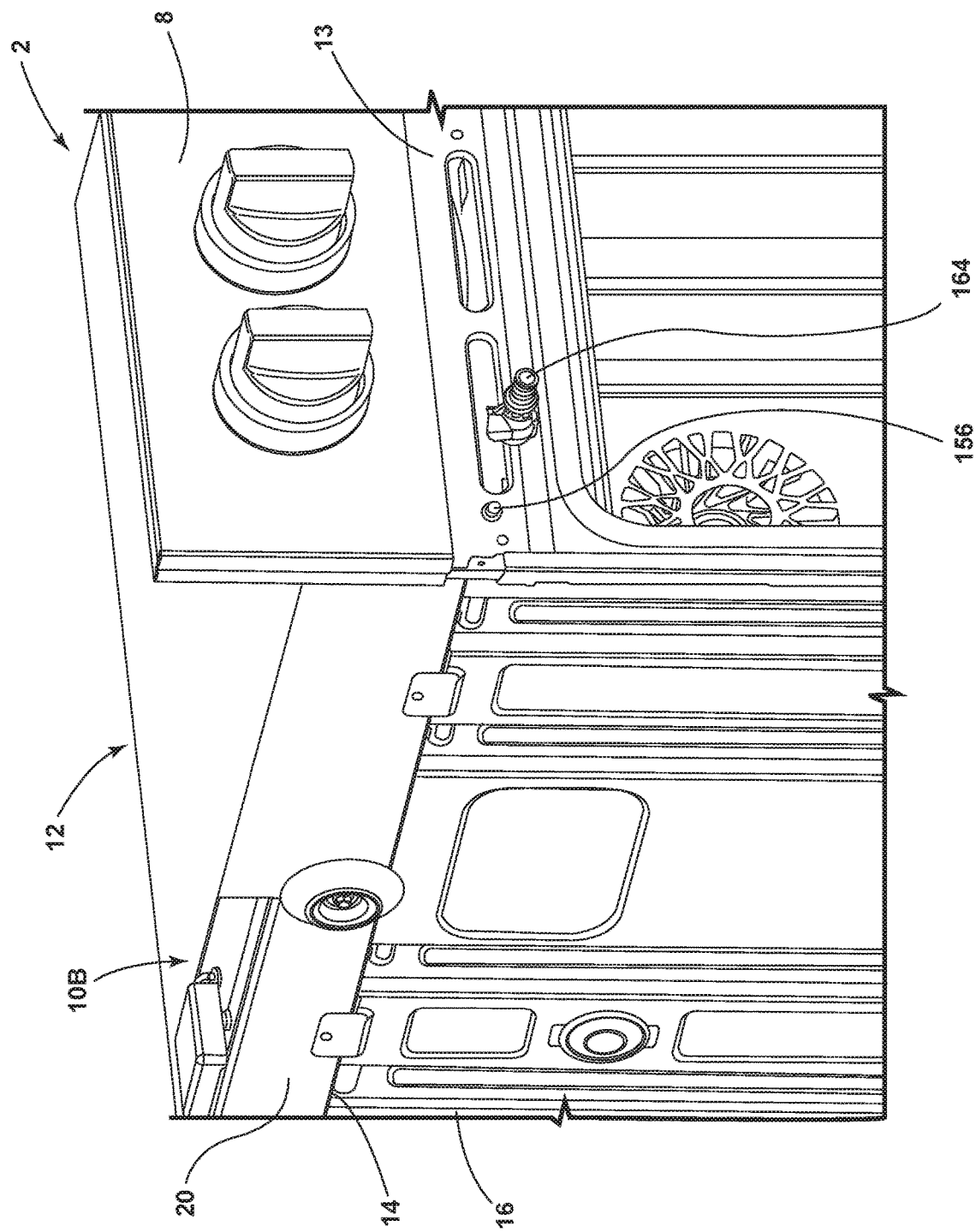
FIG. 12B is a front perspective view of the quick connect water inlet system of FIG. 12A.

Referring now to FIG. 12A, another embodiment of a steam generating system 10B is shown with the quick connect inlet stem 156 disposed on a front portion 13 of the chassis 12, such that the quick connect inlet stem 156 is accessible when the door 4 (FIG. 1) of the oven 2 is open, and concealed when the door 4 is closed. In the embodiment shown in FIG. 12A, an external hose 162 includes a female quick connect first end 164 that is contemplated to connect, in a quick connect manner, to the male quick connect inlet stem 156. This connection between the external hose 162 and the male quick connect inlet stem 156 can be accomplished in a number of ways. The male stem 156 and the female quick connect end 164 may connect in a friction fit manner, a snap fit engagement, a threaded engagement, or a ball bearing type quick connect system. With reference to FIG. 12B, the male quick connect inlet stem 156 is shown extending outwardly from the front portion 13 of the chassis 12 that is generally concealed by the oven door 4 when the oven door 4 is in a closed position. In this embodiment, the quick connect inlet stem 156 is revealed and made accessible for connecting to female quick connect first end 164 of the external hose 162 for filling the steam generating system 10B, and/or discharging water therefrom, when the oven door 4 is opened. It is contemplated that the male and female parts of the inlet stem and the quick connect end can be reversed.

Figure 12C:
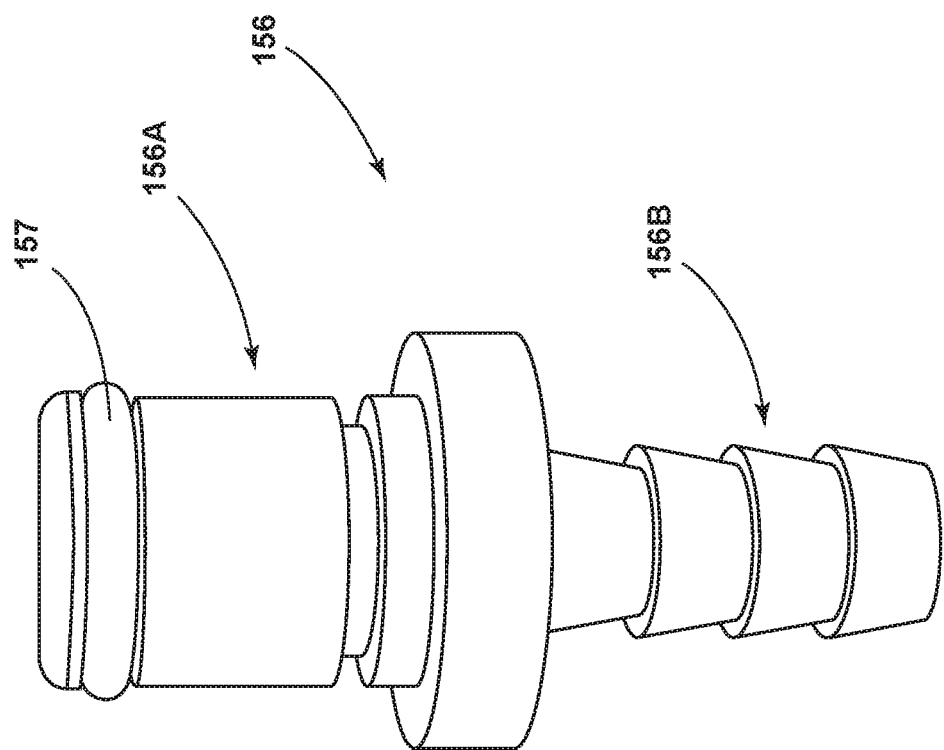
FIG. 12C is a front elevational view of a quick connect inlet stem.
Figure 12D:
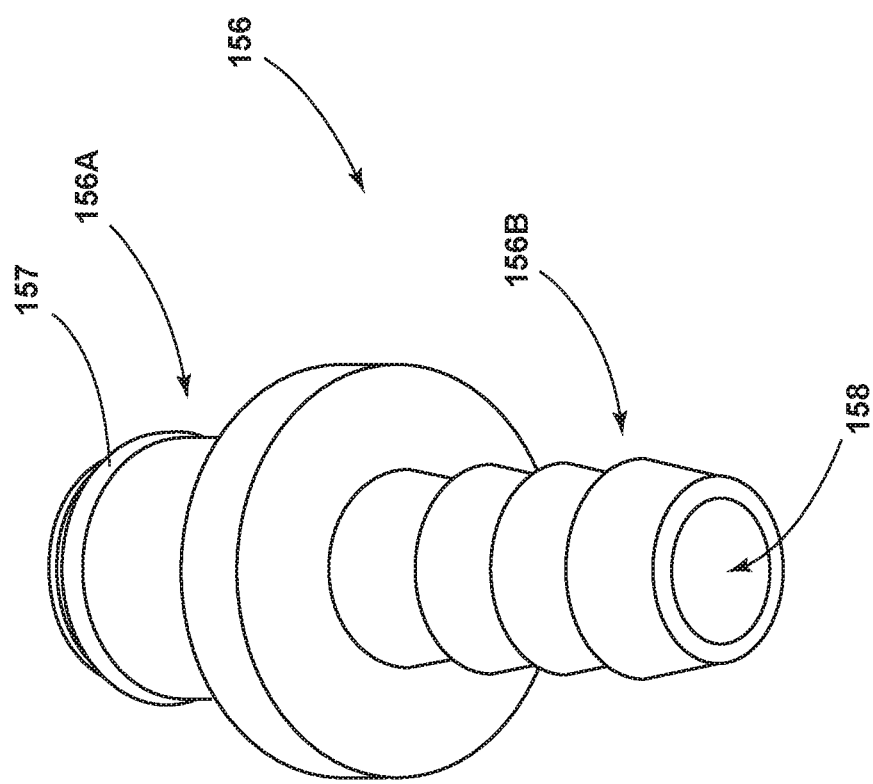
FIG. 12D is a front perspective view of the quick connect inlet stem of FIG. 12C.
Figure 12E:
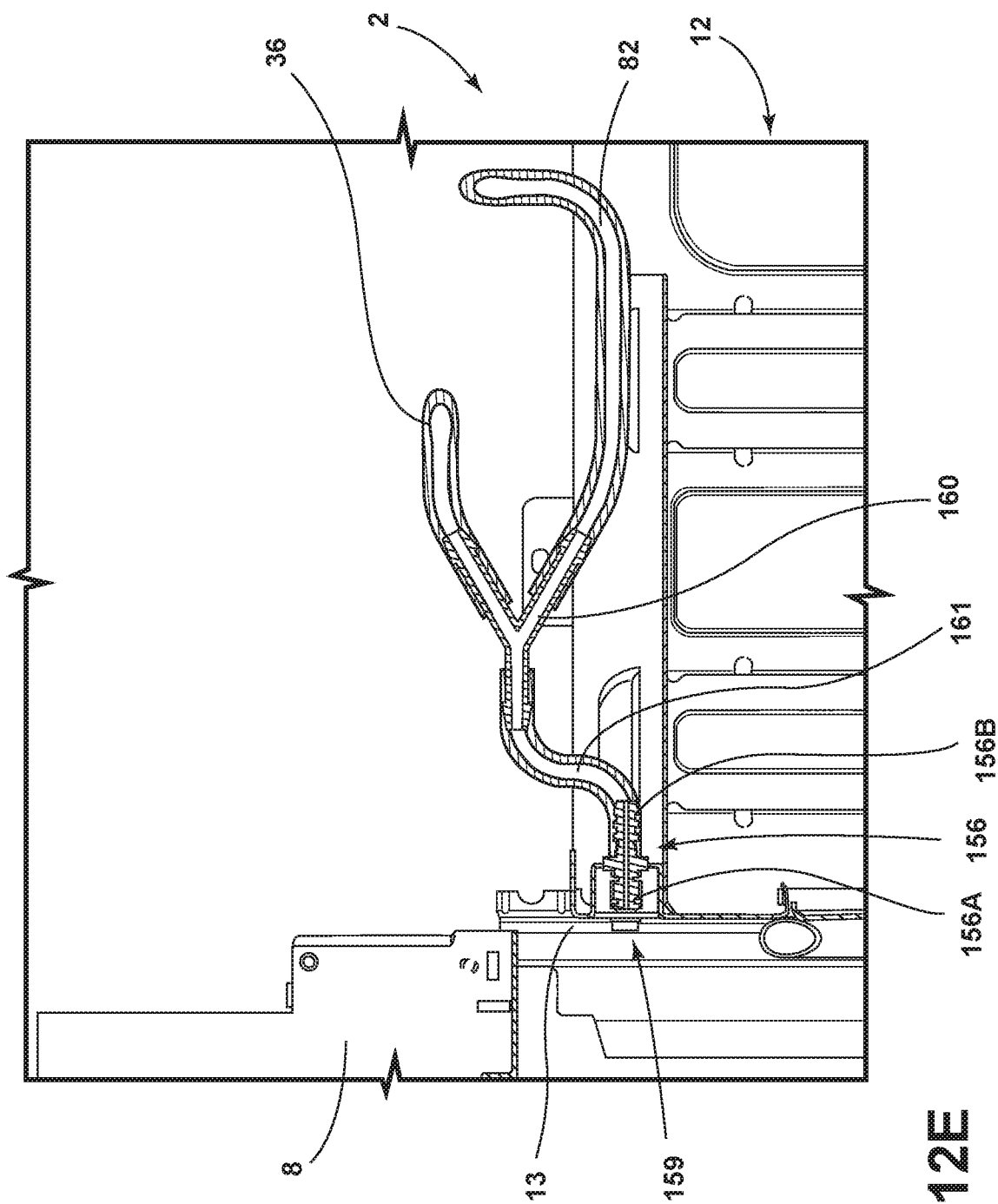
FIG. 12E is a partial cross-sectional view of a quick connect water inlet system having the quick connect inlet stem of FIG. 12C installed therein.
Figure 12F:
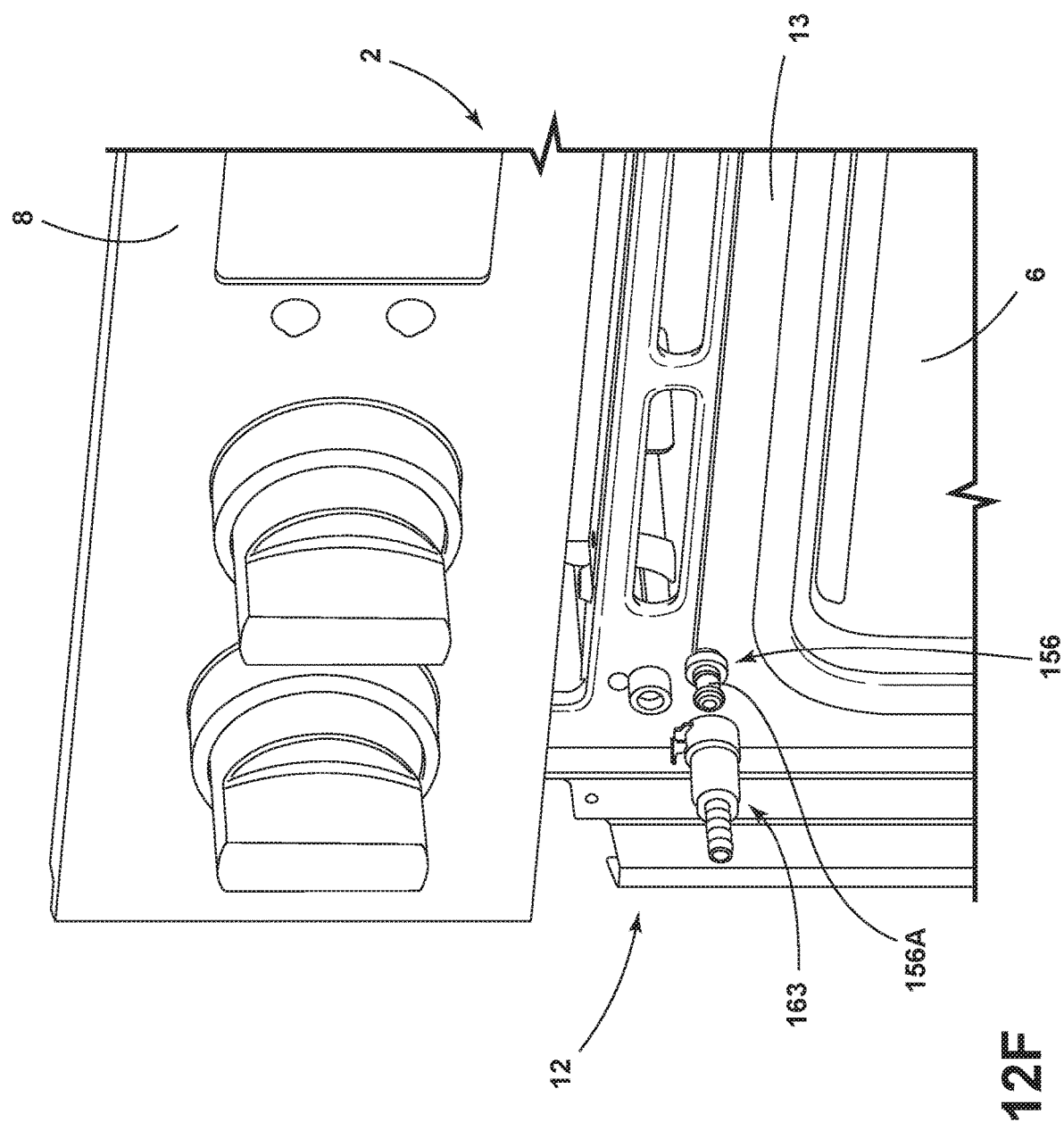
FIG. 12F is a front perspective view of a hose extension exploded away from an externally accessible end of a quick connect inlet stem mounted on the chassis.

Referring now to FIGS. 12C and 12D, the male quick connect inlet stem 156 is shown having a quick connect end 156A and a hose connecting end 156B. The quick connect end 156A includes a seal ring 157. As best shown in FIG. 12D, the male quick connect inlet stem 156 includes a channel 158 disposed therethrough. Referring now to FIG. 12E, the male quick connect inlet stem 156 may be flush mounted to the front portion 13 of the chassis 12 and interconnected with multiple hoses 161, 36, 82 within the steam generating system 10. As further shown in FIG. 12E, an outermost end 159 of the male quick connect inlet stem 156 is accessible by a user when the door 4 (FIG. 1) of the oven 2 is open. Referring now to FIG. 12F, the entire quick connect end 156A of the male quick connect inlet stem 156 is shown accessible and extending outwardly from the front portion 13 of the chassis 12 of the oven 2. A hose extension 163 is shown for coupling to the quick connect end 156A of the male quick connect inlet stem 156. The hose extension 163 can be coupled to an external hose for reception within an external reservoir for providing water to the steam generating system 10.

Figure 13:
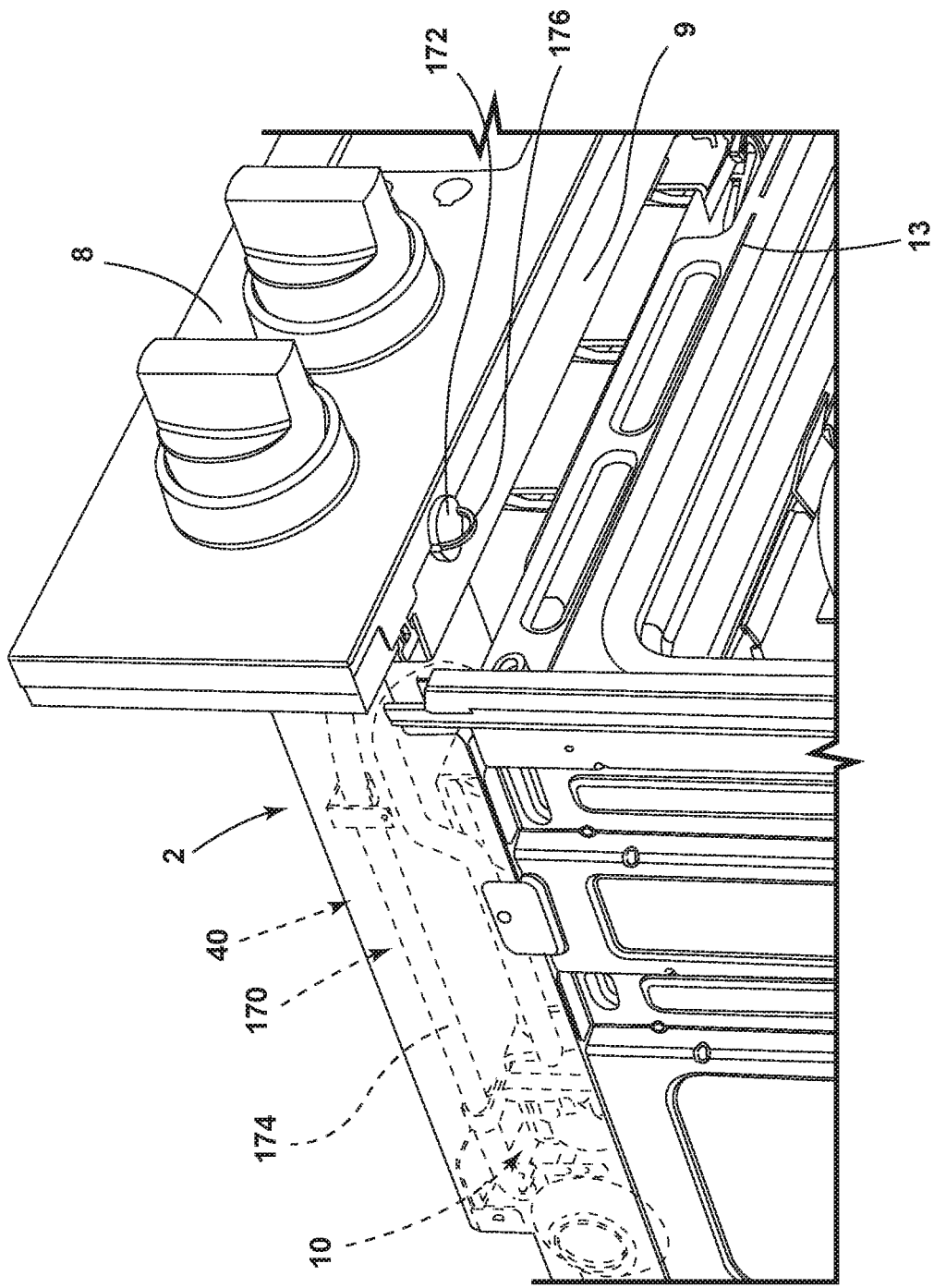
FIG. 13 is a bottom perspective view of an oven having a retractable hose water connecting system showing the retractable hose in a retracted position.

Referring now to FIG. 13, the water connecting system 40 may also include a retractable hose system 170. In the embodiment shown in FIG. 13, an outer end 172 of a retractable hose 174 is shown disposed on an underside 9 of the user interface panel 8 of the oven 2. In this way, the outer end 172 of the retractable hose system 170 is generally positioned within a gap between user interface panel 8 and the door 4 when the door 4 is in a closed position to substantially conceal the water connecting system 40. The outer end 172 of the hose 174 is shown having a handle 176 that can be engaged by a user to draw the retractable hose 174 out of the oven 2. In the embodiment shown in FIG. 13, the retractable hose 174 is in a stowed or retracted position. Movement of the retractable hose 174 from the retracted position to an extended or deployed position is further described below.

Figure 14A:
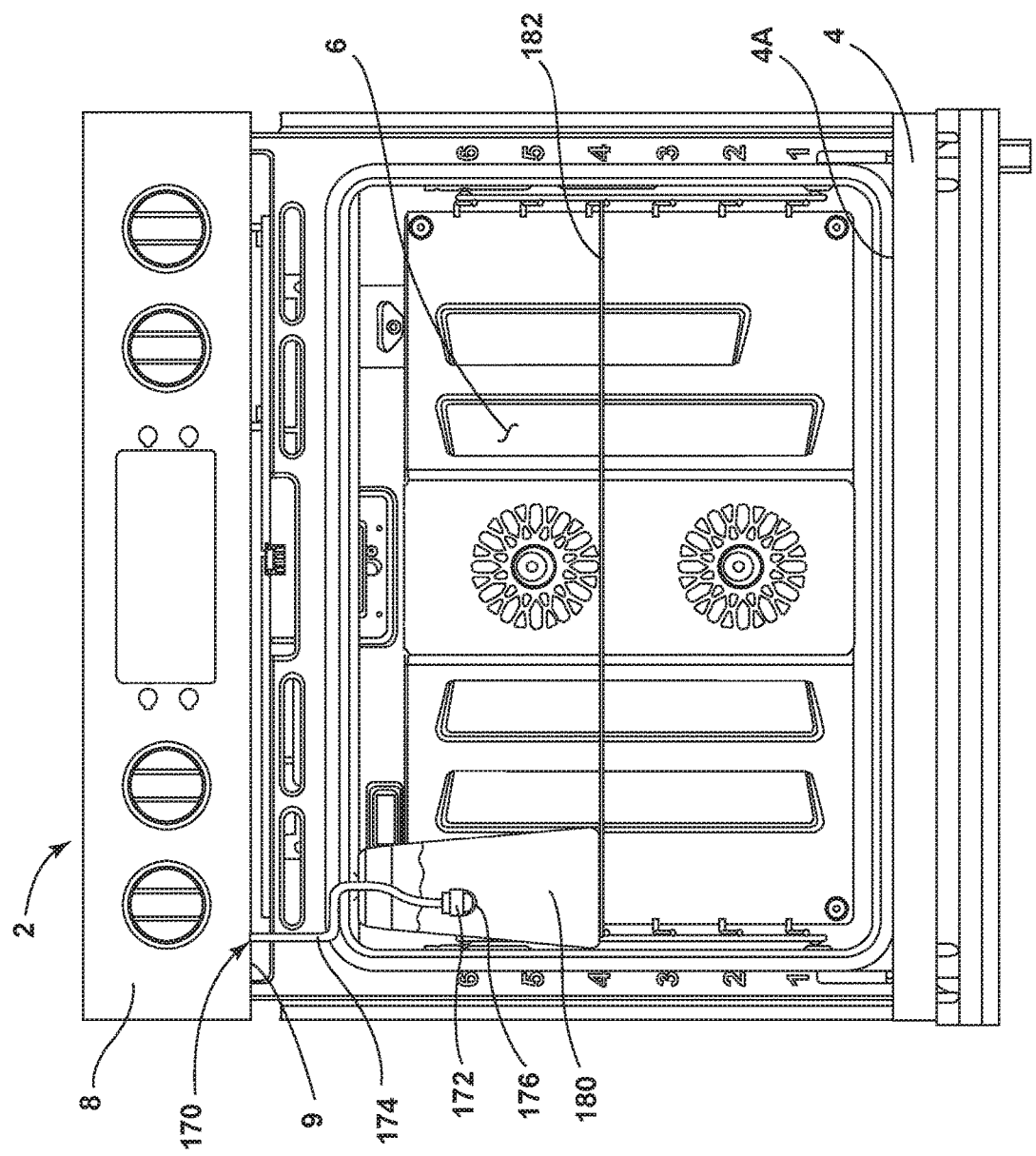
FIG. 14A is a front elevational view of the oven of FIG. 13 showing the retractable hose in an extended position with a water reservoir supported on an oven rack.
Figure 14B:
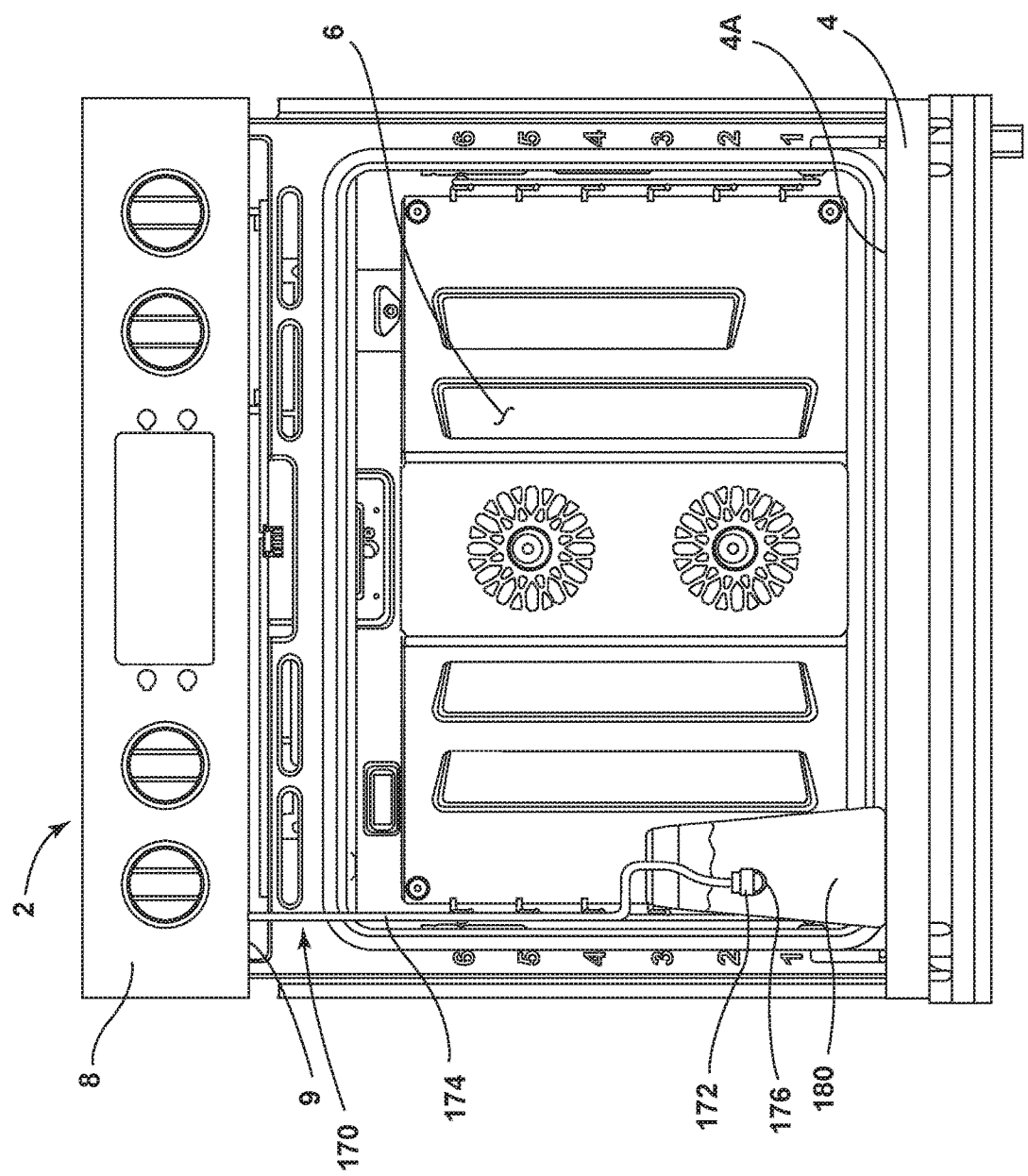
FIG. 14B is a front elevational view of the oven of FIG. 14A with a water reservoir supported on an open door of the oven.

Referring now to FIG. 14A, the retractable hose 174 of the retractable hose system 170 is shown extended outwardly from the underside 9 of the user interface panel 8. The hose 174 is extended outwardly for connection with the external reservoir 180 that is shown supported on an oven rack 182 within the cooking cavity 6 of the oven 2. As noted above, the external reservoir 180 can also be positioned on an inner surface 4A of the open door 4 of the oven 2, as shown in FIG. 14B. The retractable hose system 170 is configured to allow for deployment of the retractable hose 174, such that the end portion 172 thereof can reach a volume of water stored in the external reservoir 180. The retractable hose 174 is configured to remain in the deployed or extended position using a push-push connector assembly, as further described below. When the retractable hose 174 must be retracted into the oven 2, the push-push mechanism is released to retract the retractable hose 174 which is biased towards the retracted position. While FIGS. 14A and 14B depict the retractable hose 174 interconnecting the external reservoir 180 with the oven 2, it is contemplated that the external hose 162 (FIG. 12A) can also interconnect with the external reservoir 180 of the oven 2 in a similar manner. Thus, a second end of the external hose 162 can be positioned within the external reservoir 180 to provide fluidic contact with a volume of water stored therein, while the first end 164 of the external hose 162 is coupled to the inlet 156 of the oven 2.

Figure 15:
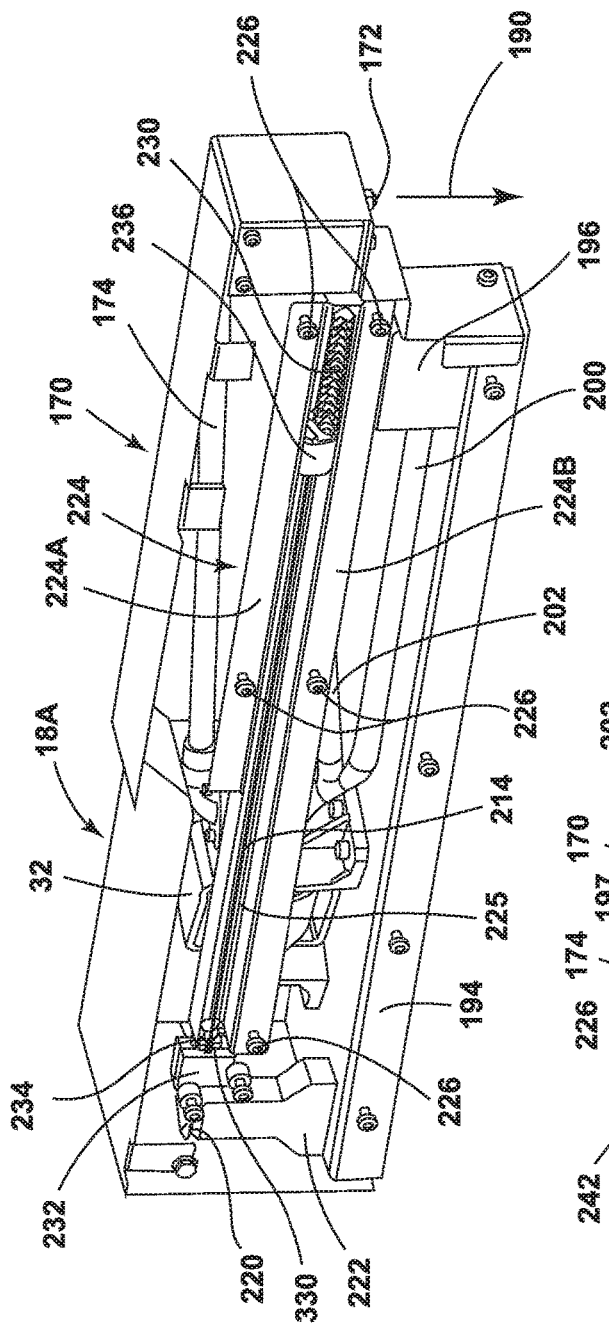
FIG. 15 is a top perspective view of the retractable hose water connecting system showing the retractable hose in a retracted position from a first side.

Referring now to FIG. 15, the retractable hose system 170 is shown with the retractable hose 174 in the retracted position, such that the end portion 172 is drawn towards and abutting a housing 18A. In the embodiment shown in FIG. 15, inlet pump 32 is shown enclosed within the housing 18A which also houses the retractable hose system 170. The housing 18A defines an enclosure for both the inlet pump 32 and retractable hose system 170 which is contemplated to be mounted to the chassis 12 (FIG. 1) of the oven 2. Specifically, it is contemplated that the housing 18A may be mounted to the upper wall 14 of the chassis 12, in a similar location as pump housing 18 shown mounted in FIG. 1. In FIG. 15, a sidewall 197 (FIG. 16) of the housing 18A has been removed to reveal the retractable hose system 170 housed within. A track assembly 224 is shown in FIG. 15 having upper and lower mounting flanges 224A, 224B positioned on opposite sides of a channel 225. In assembly, the upper and lower mounting flanges 224A, 224B are mounted to sidewall 197 via fasteners 226, as shown in FIG. 16.

Figure 16:
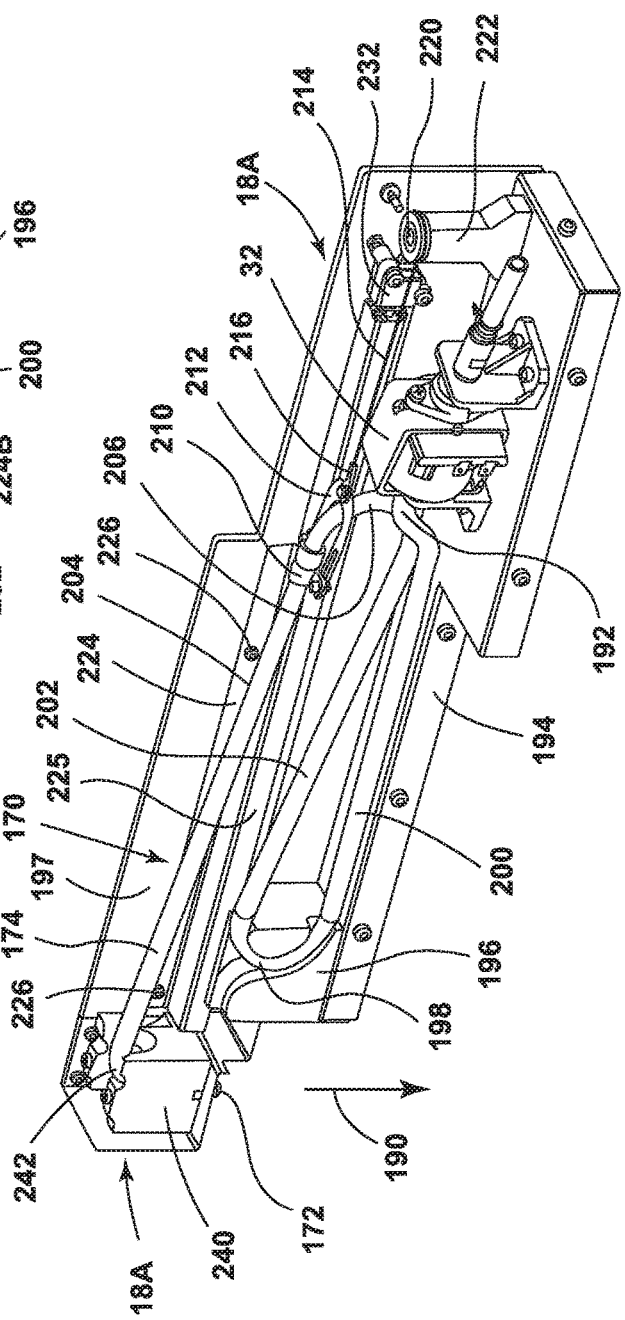
FIG. 16 is a top perspective view of the retractable hose water connecting system of FIG. 15 shown from a second side.

Referring now to FIG. 16, the retractable hose 174 is again shown in the retracted position with the outer end 172 abutting the housing 18A. Again, the outer end 172 of the retractable hose 174 is configured to be engaged by a user for extending the retractable hose 174 out from the housing 18A in a downward direction as indicated by arrow 190. The inner end 192 of the retractable hose 174 is shown coupled to the inlet pump 32 in a fluidic manner. From the inlet pump 32, the retractable hose 174 is positioned along a base portion 194 of the housing 18A to a shoulder member 196 having a channel 198 disposed therethrough which extends upwardly in a curved manner, such that the retractable hose 174 enters the channel 198 of the shoulder member 196 at a lower portion of the shoulder member 196 and exits at an upper portion of the shoulder member 196. The shoulder member 196 is further described in detail below with reference to FIG. 27. This first length of the retractable hose 174 is identified as the first portion 200 and is contemplated to remain in-place between the shoulder member 196 and the inlet pump 32 while the remaining portions of the retractable hose 174 are deployed and retracted into and out of the housing 18A.

Figure 17:
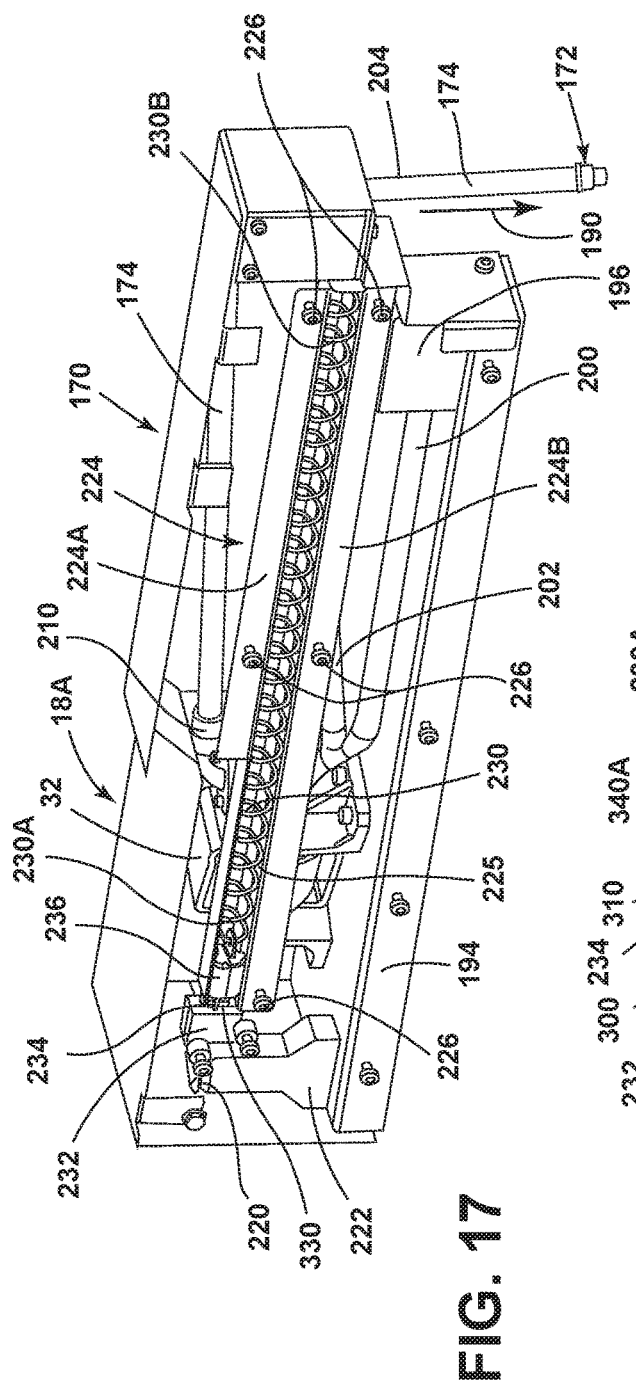
FIG. 17 is a perspective view of the retractable hose system of FIG. 15 with the retractable hose shown in an extended position.

A second portion 202 of the retractable hose 174 extends from the upper portion of the shoulder member 196 towards the base portion 194 of the housing 18A when the retractable hose 174 is in the retracted position, as shown in FIGS. 15 and 16. This second portion 202 of the retractable hose 174 curves upwardly at a location indicated at reference numeral 206. A bracket 210 is coupled to the hose 174 at a third portion 204 of the retractable hose 174. The bracket 210 is further coupled into a U-shaped bracket 212 at opposite sides of the retractable hose 174. The brackets 210, 212 are used to couple a wire or cable 214 to the retractable hose 174. The wire 214 is coupled to the U-shaped bracket 212 at an eyelet 216. The wire 214 is drawn around a pulley 220 that is positioned on a mounting member 222 that is mounted to the base portion 194 of the housing 18A. The pulley 220 is configured to rotate and guide the wire 214 around the end of the track assembly 224 to an opposite side of a track assembly 224. On the opposite side of the track assembly 224, the wire 214 is coupled to a biasing mechanism 230 through a striker assembly 236, as further described below. The biasing mechanism 230 is best shown in FIGS. 15 and 17 in the form of a coil spring. A push-push connector assembly 232 is configured to be coupled to the sidewall 197 of the housing 18A adjacent the pulley 220 and mounting member 222. The push-push connector assembly 232 includes a stationary female end 234 which is configured it receive and engage the striker assembly 236 that is positioned between the wire 214 and the spring 230. As further shown in FIG. 16, the third portion 204 of the retractable hose 174 is positioned between the brackets 210, 212 and a front end of the housing 18A, when the retractable hose 174 is in the retracted position. The extension of the retractable hose 174 and the engagement of the component parts of the push-push connector assembly 232 is described below with reference to FIG. 17. Individual components of the retractable hose system 170 are further described below with reference to FIGS. 19A-28.

Figure 28:
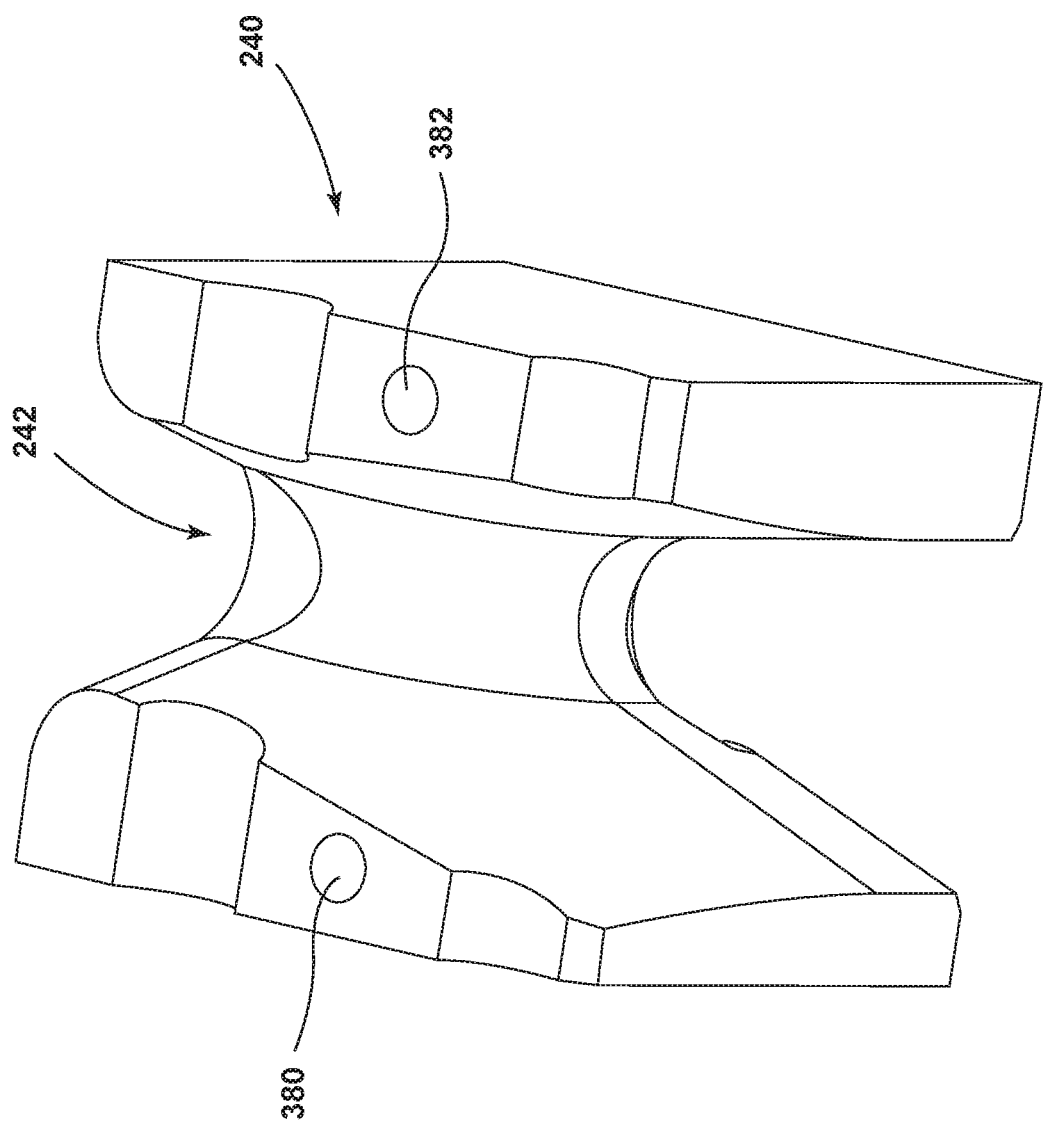
FIG. 28 is a top perspective view of a guide member.

Referring now to FIG. 17, the retractable hose 174 is shown in the extended or deployed position, such that the third portion 204 of the retractable hose 174 is extended outwardly form the housing 18A. As the retractable hose 174 is pulled by a user in the downward direction as indicated by arrow 190, the second and third sections 202, 204 are pulled towards a downwardly directed guide member 240 which is mounted to a front end of the housing 18A. The guide member 240 includes a downwardly directed channel 242 disposed therethrough. The guide member 240 is best shown in FIGS. 16, 28, and is concealed in the embodiment shown in FIG. 17. Referring again to FIG. 16, the second and third portions 202, 204 of the retractable hose 174 are slack portions of the retractable hose 174 that can be deployed from the housing 18A and are moveable within the housing 18A. As the user engages the outer end 172 of the retractable hose 174, the slack portions (the second and third portions 202, 204 of the retractable hose 174) are pulled out of the housing 18A, such that the brackets 210, 212 that interconnect the retractable hose 174 with the wire 214 are pulled from the retracted position shown in FIG. 16 towards the guide member 240 disposed at the front portion of the housing 18A. This movement draws the wire 214 around the pulley 220, thereby drawing the striker assembly 236 of the push-push connector assembly 232 towards the female connector end 234. This movement of the striker assembly 236 along the channel 225 of the track assembly 224 stretches and loads the spring 230 which is connected to the striker assembly 236 at a first end 230A, and further connected to a front portion of the track assembly 224 at a second end 230B. The channel 225 of the track assembly 224 defines an outwardly opening channel in which the striker assembly 236 is slidably retained for movement along the channel 225.

In the embodiment shown in FIG. 17, the retractable hose 174 is contemplated to be fully extended, such that the striker assembly 236 of the push-push connector assembly 232 is shown engaged with the female connector end 234. When the striker assembly 236 and the female connector end 234 of the push-push connector assembly 232 engage one another, the retractable hose 174 will be retained in the extended position, as shown in FIG. 17. As further shown in FIG. 17, the outer end 172 of the retractable hose 174 is shown having a configuration that is the same or similar to the quick connect inlet stem 156 discussed above with reference to FIGS. 12C and 12D.

Figure 18:
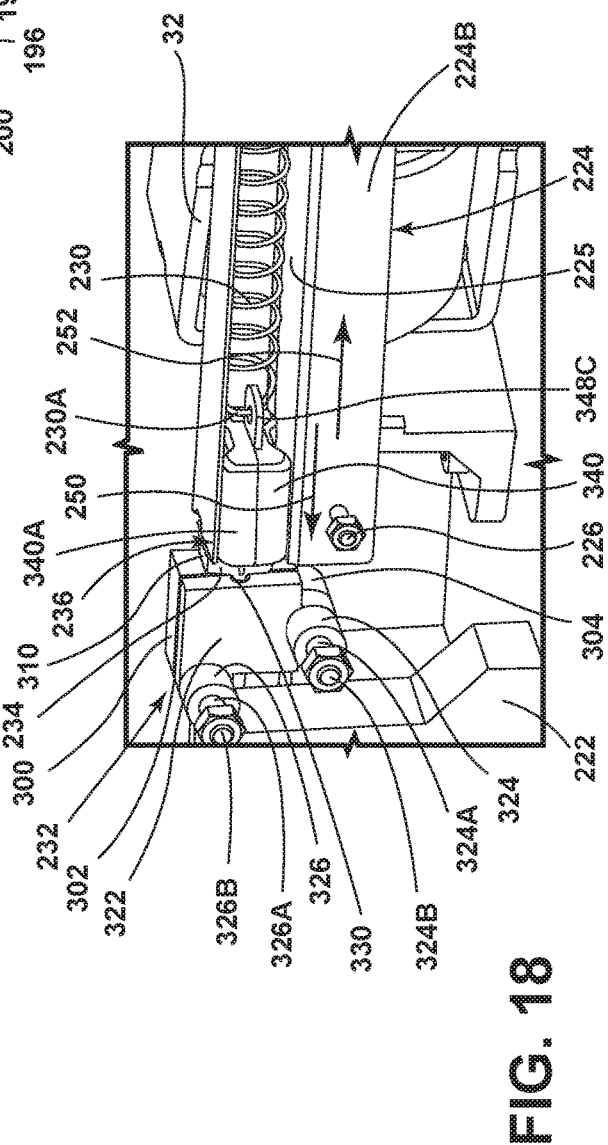
FIG. 18 is a close-up view of a push-push connection system of FIG. 17 as incorporated into the retractable hose water connecting system.

Referring now to FIG. 18, when a user wishes to retract the retractable hose 174 into the housing 18A, the user will pull downwardly on the already extended retractable hose 174 in the direction as indicated by arrow 190 which will move the striker assembly 236 inwardly in the direction as indicated by arrow 250, as shown in FIG. 18. This further inward movement of the striker assembly 236 towards the female connector end 234 of the push-push connector assembly 232 releases the striker assembly 236 from the female connector end 234, such that the striker assembly 236 is returned to an at-rest or home position (shown in FIG. 15) in a direction as indicated by arrow 252 under a biasing force provided by the spring 230. As such, the striker assembly 236 will be drawn from the rear portion of the track assembly 224 (FIG. 15) to the front portion of the track assembly 224 along the channel 225 disposed therein. This longitudinal sliding movement of the striker assembly 236 draws the wire 214 back towards the retracted position as shown in FIG. 16. This biased movement of the wire 214 draws the retractable hose 174 towards the retracted position shown in FIG. 16. Thus, with the present concept, a user can engage the outer end 172 with the retractable hose 174 to pull the retractable hose 174 from the pump housing 18A and engage the retractable hose 174 with an external reservoir, such as reservoir 180 shown in FIG. 14A. While engaging the reservoir, the retractable hose 174 will remain in the extended position by the interconnection of the striker assembly 236 and the female connector end 234 of the push-push connector assembly 232. When the user wishes to retract the retractable hose 174 into the housing 18A, the user will pull further downward on the hose 174 to disengage the striker assembly 236 and the female connector end 234 of the push-push connector assembly 232 to allow the striker assembly 236 to retract along the track assembly 224 under the biasing force of the spring 230.

Figure 19A:
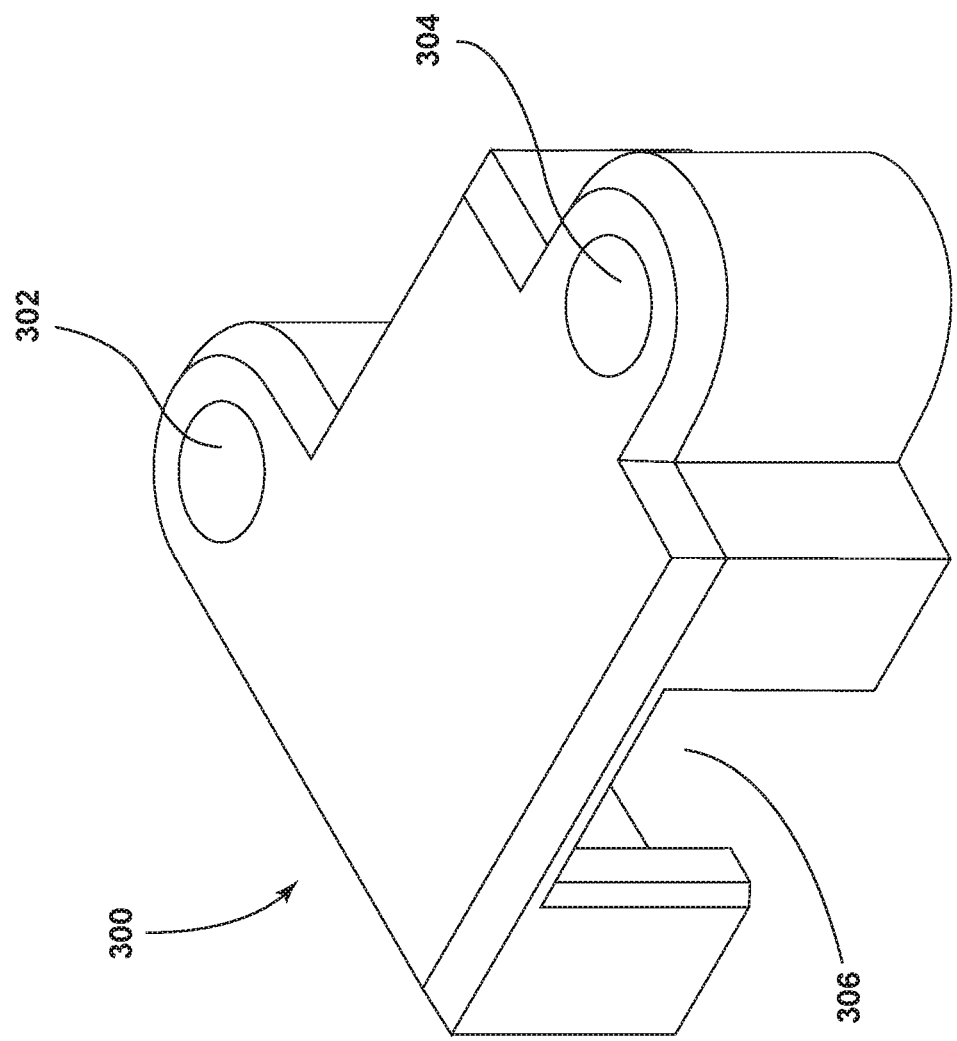
FIG. 19A is a top perspective view of a push-push connector housing.
Figure 19B:
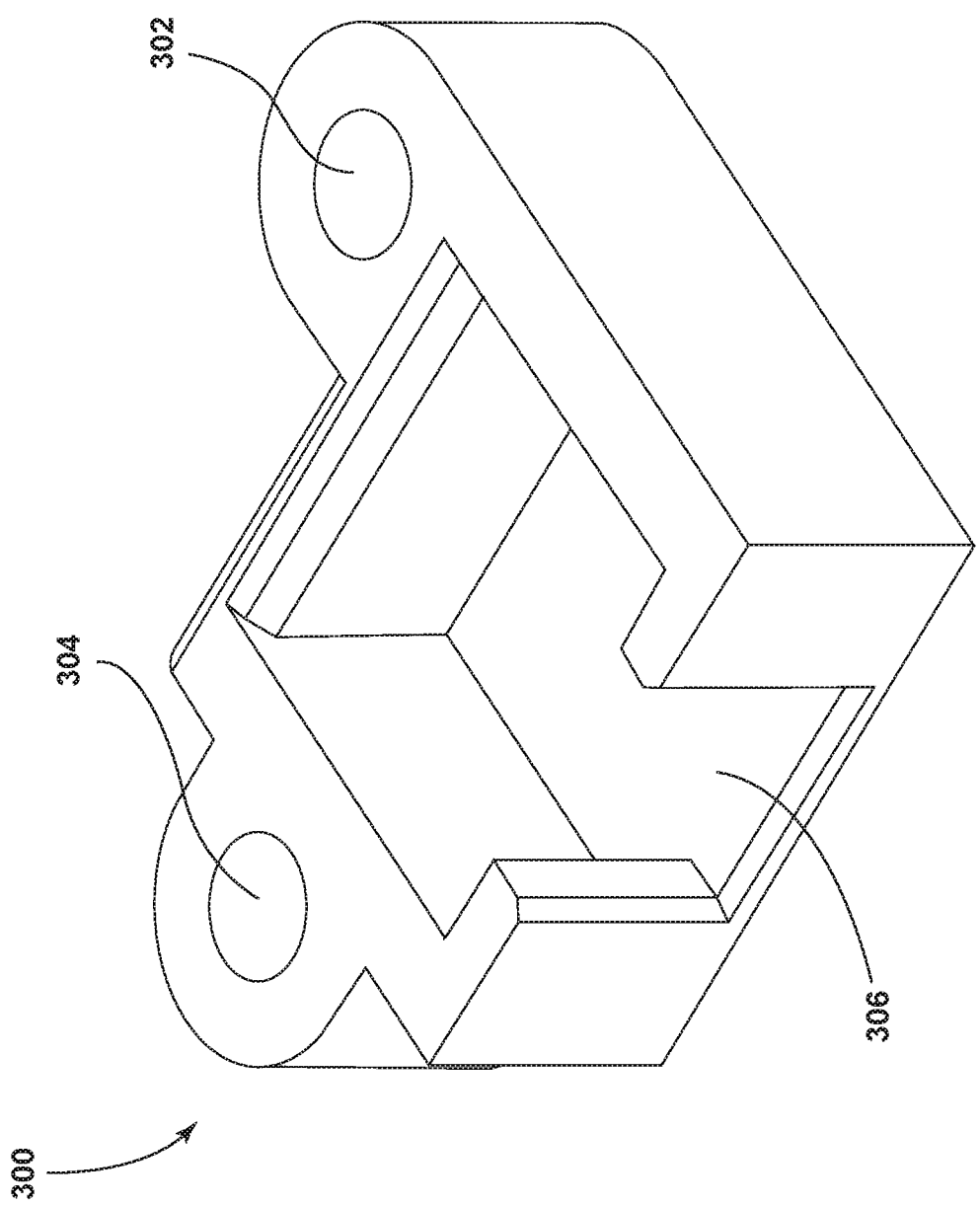
FIG. 19B is a bottom perspective view of the push-push connector housing of FIG. 19A.

Referring now to FIG. 19A, a housing 300 of the push-push connector assembly 232 (FIG. 18) is shown having mounting apertures 302, 304 and an interior cavity 306. The interior cavity 306 of the housing 300 is best shown in FIG. 19B. The housing 300 is contemplated to provide an enclosure for a push-push connector device 310 as shown in FIGS. 20A, 20B. The housing 300 is part of the overall push-push connector assembly 232 shown in FIGS. 15-18. The housing 300 couples to a spacer assembly 322 (FIG. 21) around the push-push connector device 310, to retain the push-push connector device 310 in the interior cavity 306 of the housing 300. The coupling of the housing 300 to the spacer assembly 322 is best shown in FIG. 18.

Referring now to FIGS. 20A, 20B, the push-push connector device 310 is shown having a main housing 312 which houses a biasing mechanism 314 shown in the form of a spring. The push-push connector device 310 further includes an engagement assembly having first and second coupling arms 316, 318 with inner barb portions 316A, 318A. The engagement assembly of push-push connector device 310 defines the female connector end 234 of the push-push connector assembly 232 described above. The first and second coupling arms 316, 318 of the female connector end 234 are operable between engaged and disengaged positions relative to the striker assembly 236, as further described below.

Figure 21:
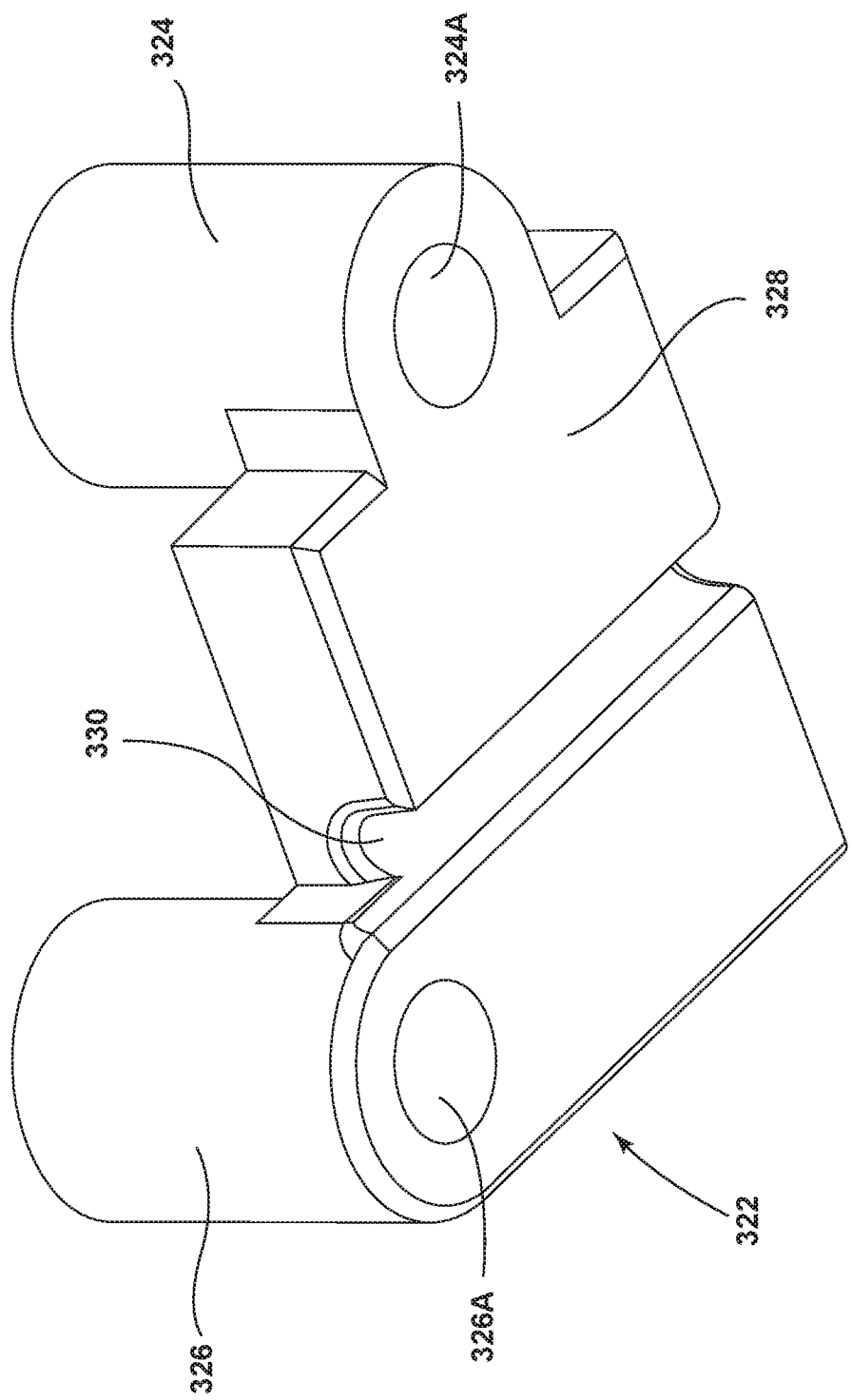
FIG. 21 is bottom perspective view of a spacer assembly.

Referring now to FIG. 21, the spacer assembly 322 is shown having mounting bosses 324, 326 with respective mounting apertures 324A, 326A disposed therethrough. In assembly, the spacer assembly 322 couples to the housing 300, as shown in FIG. 18, with the mounting apertures 302, 304 of the housing 300 aligning respectively with the mounting apertures 326A, and 324A of the spacer assembly 322. The spacer assembly 322 further includes an inner surface 328 which closes off the inner cavity 306 of the housing 300 when the spacer assembly 322 is coupled to the housing 300. In this way, the push-push connector device 310 is captured between the spacer assembly 322 and the housing 300 and retained within the inner cavity 306 of the housing 300 in assembly. As further shown in FIG. 21, the spacer assembly 322 includes a channel 330 disposed along the inner surface 328. The channel 330 is configured to provide access for the wire 214 to pass through the connection of the spacer assembly 322 and the housing 300, such that the wire 214 can move through the push-push connector assembly 232, as shown in FIG. 15. The mounting bosses 324, 326 of the spacer assembly 322 are configured to mount to the sidewall 197 of the modified pump housing 18A using mounting screws 324B, 326B, as best shown in FIG. 15, which also couple the housing 300 to the spacer assembly 322. In this way, the push-push connector assembly 232 is fixedly mounted to the modified pump housing 18A.

Figure 22:
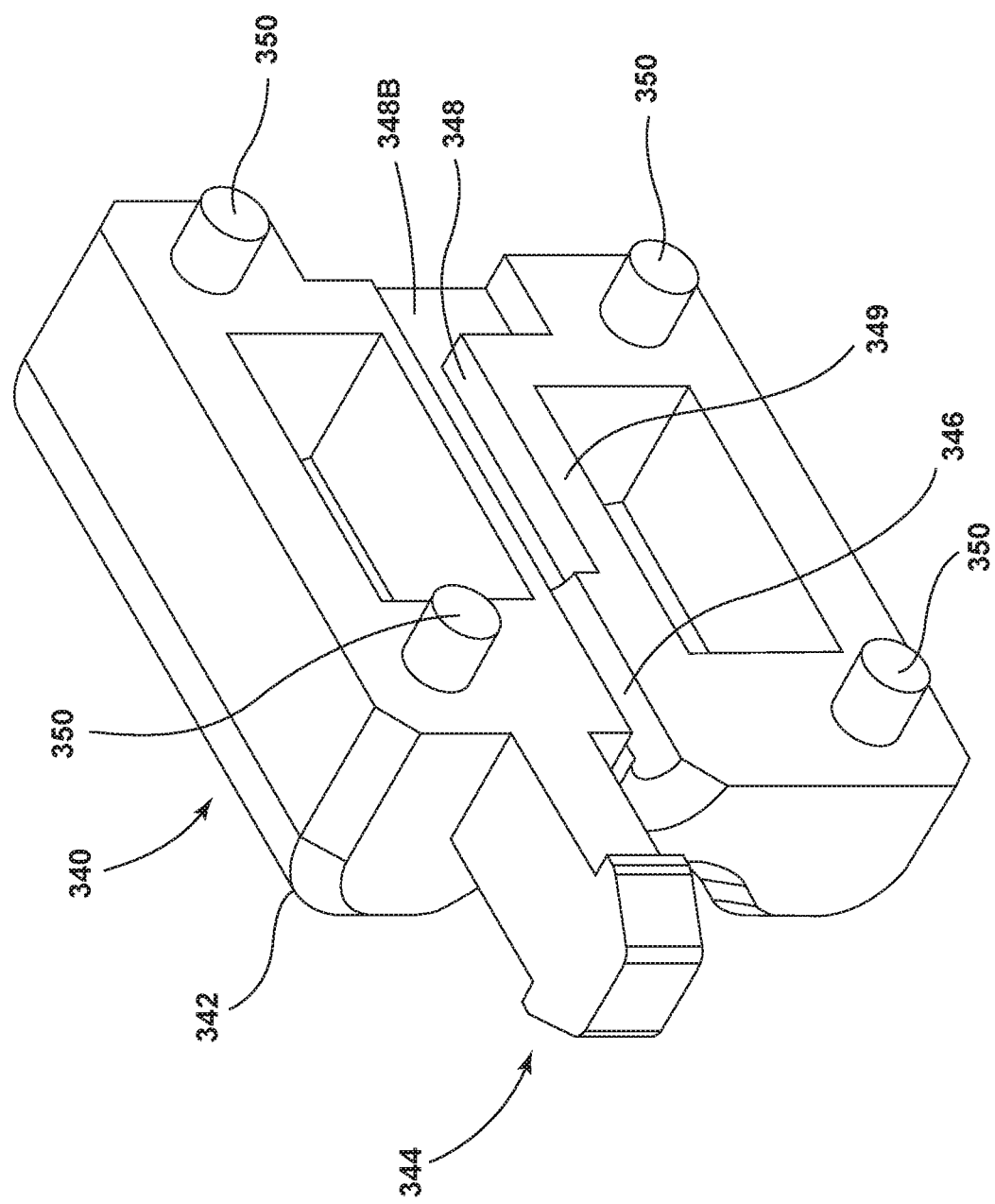
FIG. 22 is a top perspective view of a first portion of a striker assembly.

Referring now to FIG. 22, a first portion 340 of the striker assembly 236 is shown having a main body portion 342 with a striker member 344 extending outwardly therefrom. The striker member 344 engages the female connector end 234 of the push-push connector assembly 232 at push-push connector device 310. The striker member 344 is configured to be releasably engaged and retained by the coupling arms 316, 318 of the push-push connector device 310 as shown in FIG. 18. As further shown in FIG. 22, the first portion 340 of the striker assembly 236 includes a channel 346 opening into a receiving cavity 348. The channel 346 and receiving cavity 348 are recessed from an inner surface 349 of the main body portion 342. Outwardly extending from the inner surface 349 of the main body portion 342, mounting bosses 350 are disposed around a perimeter of the main body 342. The first portion 340 of the striker assembly 236 includes a recess 348B which may be used to house a connector 348C (FIG. 18) for connecting the striker assembly 236 to the spring 230.

Figure 23:
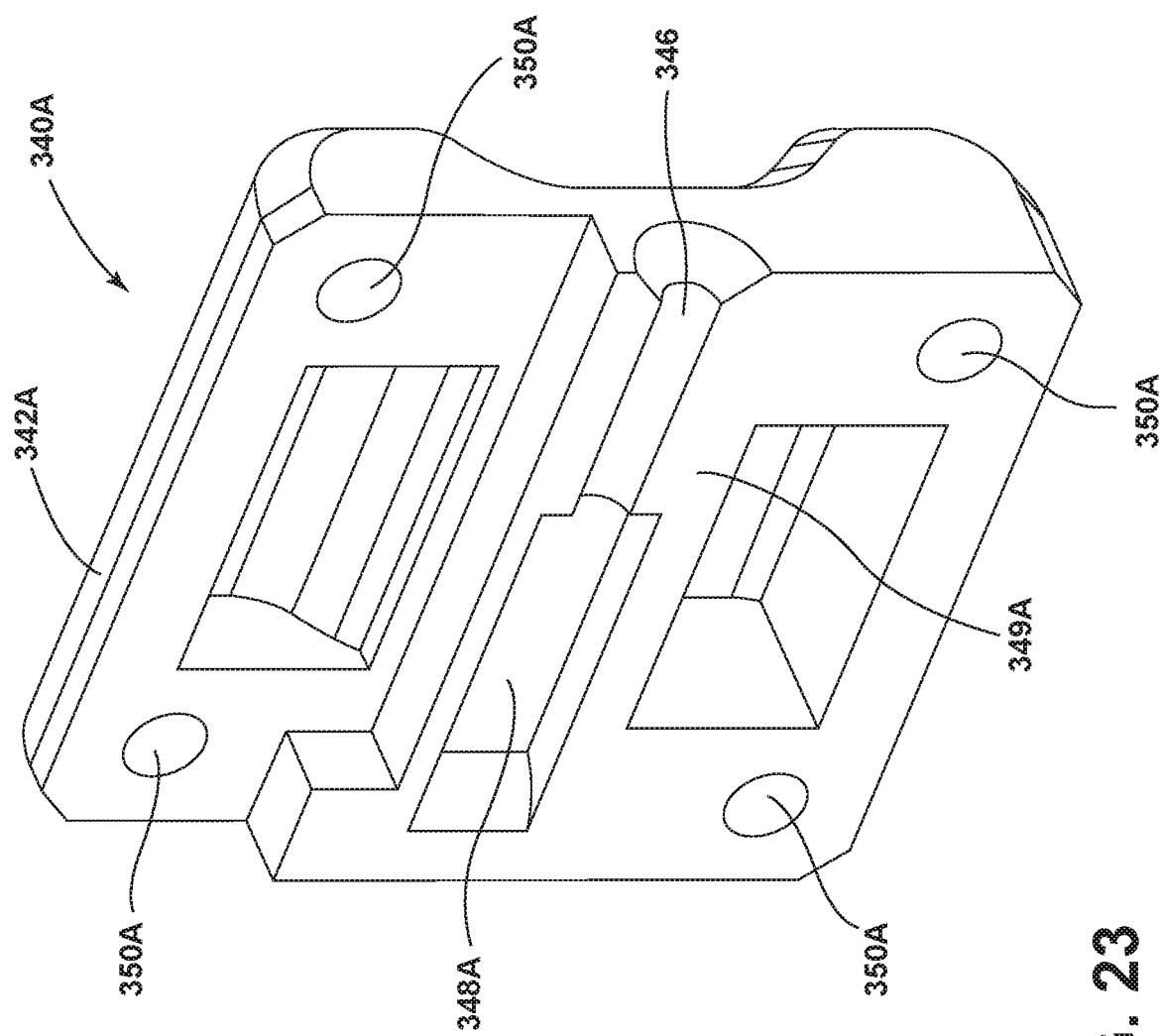
FIG. 23 is a top perspective view of a second portion of a striker assembly.
Figure 24:
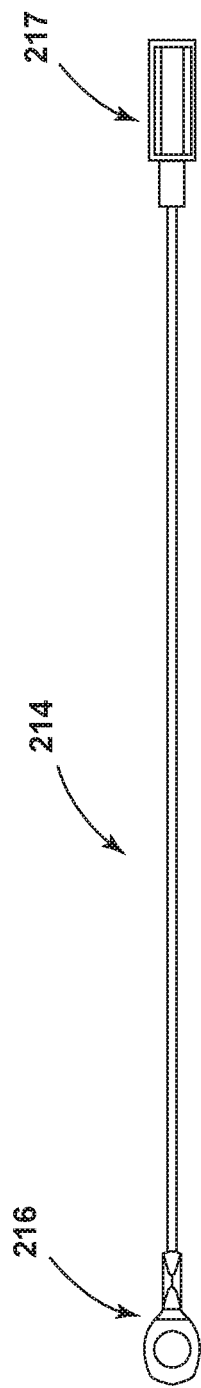
FIG. 24 is a side elevation view of a wire assembly.

Referring now to FIG. 23, a second portion 340A of the striker assembly 236 is shown having a main body portion 342A. In assembly, and best shown in FIG. 18, the first and second portions 340, 340A of the striker assembly 236 are configured to couple to one another around an anchor portion 217 of the wire 214 (FIG. 24). In this way, the first and second portions 340, 340A of the striker assembly 236 positively capture the anchor portion 217 of the wire 214 therebetween, such that the wire 214 can pull the striker assembly 236 along the channel 225 of the track assembly 224. As further shown in FIG. 23, the second portion 340A of the striker assembly 236 includes a channel 346A opening into a receiving cavity 348A. The channel 346A and receiving cavity 348A are recessed from an inner surface 349A of the main body portion 342A. The channel 346A and receiving cavity 348A of the second portion 340A of the striker assembly 236 mirror the channel 346 and receiving cavity 348 of the first portion 340 of the striker assembly 236. In this way, a single channel and receiving cavity are formed around the anchor portion 217 of the wire 214 when the first portion 340 of the striker assembly 236 is coupled the second portion 340A of the striker assembly 236. The location of the channel 346/346A of the striker assembly 236 aligns with the channel 330 of the spacer assembly 322 (FIG. 21), such that the striker member 344 of the striker assembly 236 will properly contact the push-push connector device 310, as housed in the housing 300, when the striker assembly 236 is drawn into contact with the female connector end 234 of the push-push connector assembly 232. Recessed inwardly from the inner surface 349A of the main body portion 342A of the second portion 340A, receiving apertures 350A are disposed around a perimeter of the main body 342A. In assembly, the receiving apertures 350A of the second portion 340A of the striker assembly 236 receive the mounting bosses 350 of the first portion 340 of the striker assembly 236.

Referring now to FIG. 24, the wire 214 is shown having the eyelet 216 disposed on a first side and the anchor portion 217 disposed on a second side. In assembly, the anchor portion 217 of the wire 214 is configured to be received in the receiving cavity defined by receiving cavity 348 of the first portion 340 of the striker assembly 236 and receiving cavity 348A of the second portion 340A of the striker assembly 236. In this way, the wire 214 is securely anchored to the striker assembly 236 for movement along the track assembly 224.

Figure 25:
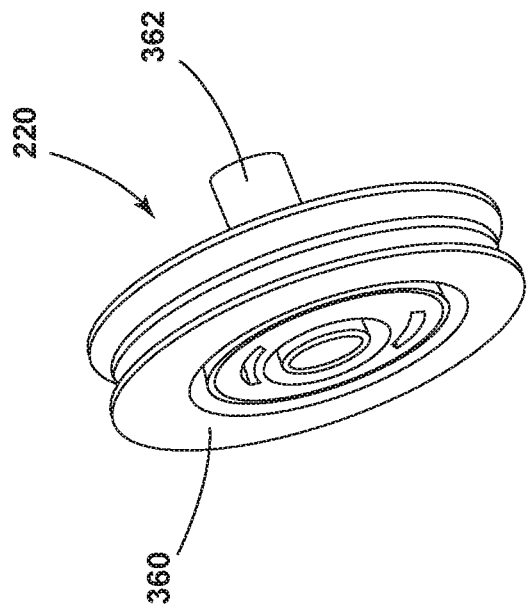
FIG. 25 is a top perspective view of a pulley assembly.
Figure 26:
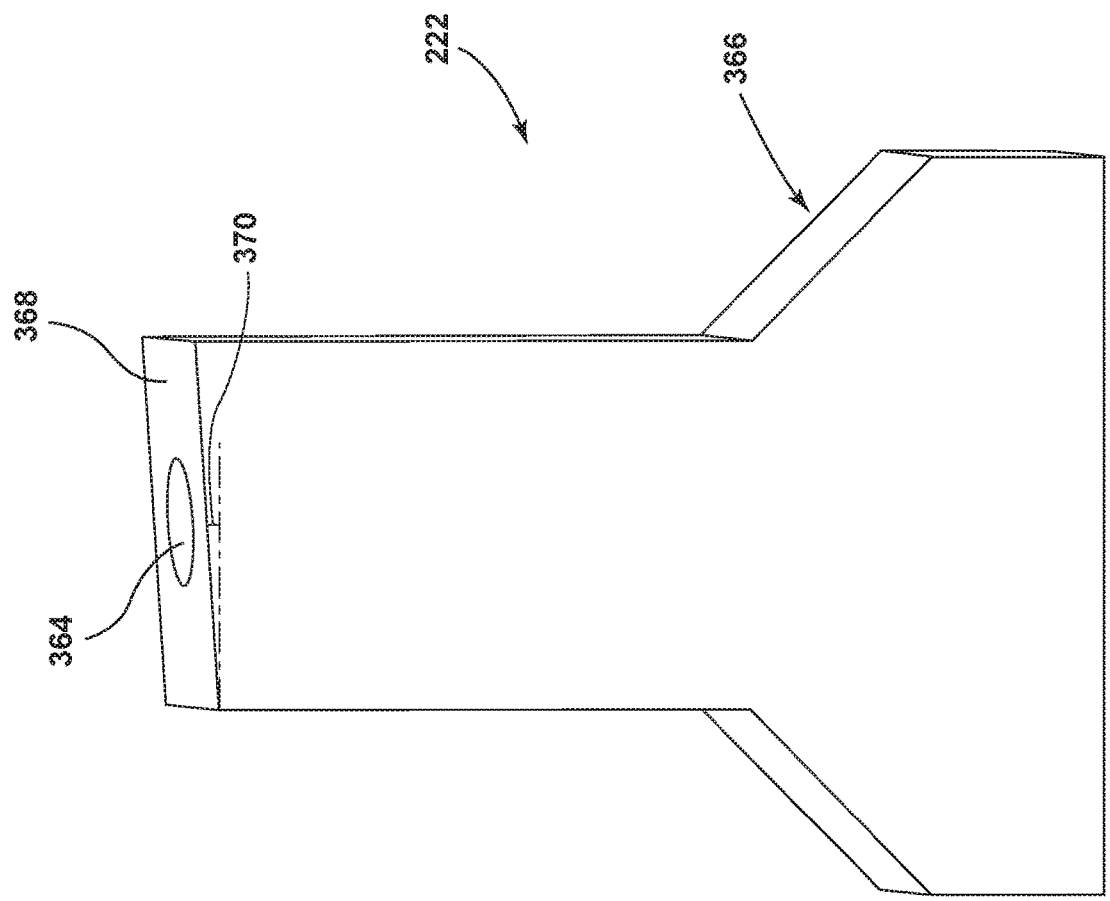
FIG. 26 is a side elevation view of a mounting member.

Referring now to FIG. 25, the pulley 220 is shown having a wheel 360 pivotally mounted on a mounting stem 362 for rotation thereon. The mounting stem 362 is configured to be received in a mounting aperture 364 of mounting member 222 as shown in FIG. 26. The mounting member 222 includes a base portion 366 which is configured to mount to the base portion 194 of the housing 18A. The mounting member 222 further includes a top surface 368 which is disposed at an angle 370 shown in FIG. 26. The angled top surface 368 provides for a proper angle for the wheel 360 of the pulley 220 to be received for the wire 214 to wrap around in assembly as shown in FIG. 16.

Figure 27:
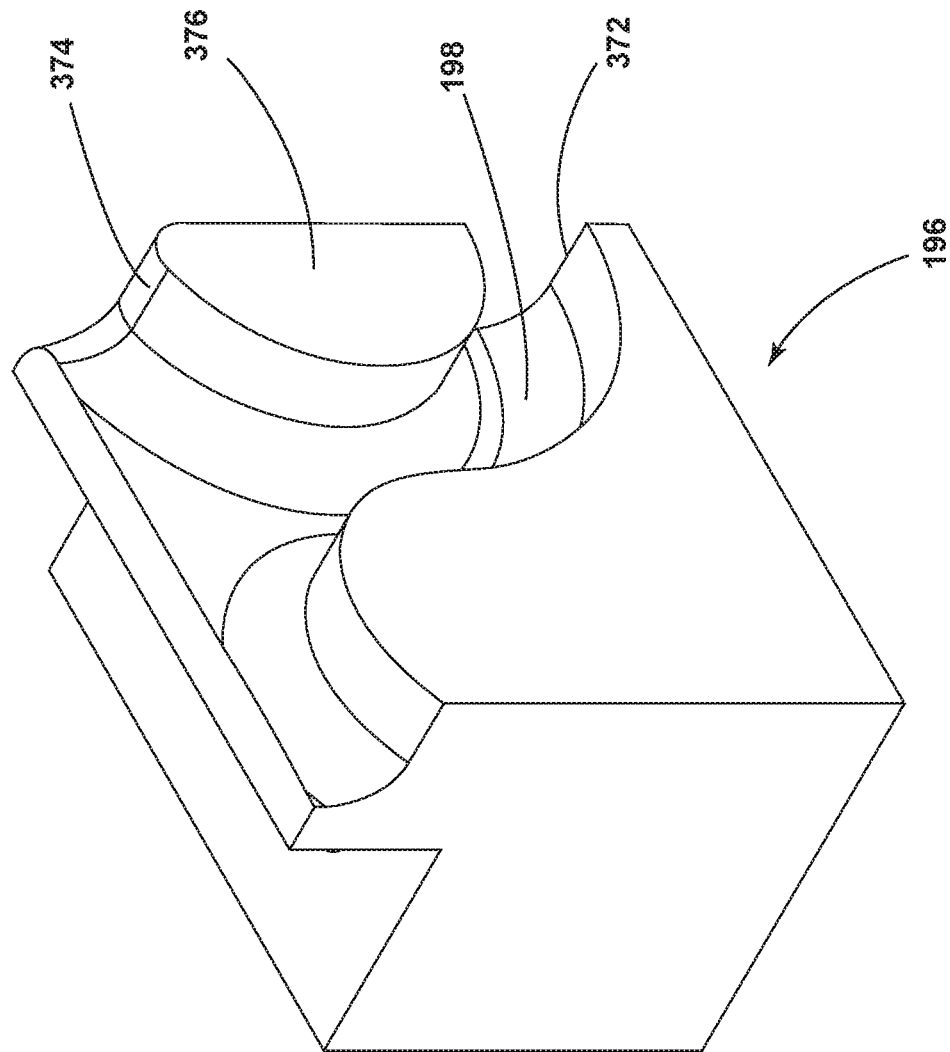
FIG. 27 is a top perspective view of a shoulder member.

Referring now to FIG. 27, the shoulder member 196 is shown having the channel 198 disposed therethrough. Specially, the channel 198 is configured to receive a portion of the retractable hose 174 as shown in FIG. 16. The retractable hose 174 enters at a lower portion 372 of the channel 198 and exits at an upper portion 374 of the channel 198 to provide a continuous curved channel 198 around a guide member 376. In this way, the retractable hose 174 will not kink as positioned within the housing 18A in the retracted position as shown in FIG. 16.

Similarly, with reference to FIG. 28, the guide member 240 is shown having the downwardly curved channel 242 that receives the retractable hose 174 as shown in FIG. 16. In this way, the retractable hose 174 can move over the guide member 240 at the curved and smooth channel 242 thereof as the retractable hose 174 moves into and out of the housing 18A. As shown in FIG. 28, the guide member 240 further includes mounting apertures 380, 382 which are disposed through the guide member 240 to mount the guide member 240 to the housing 18A in a manner as shown in FIG. 16.

Figure 29:
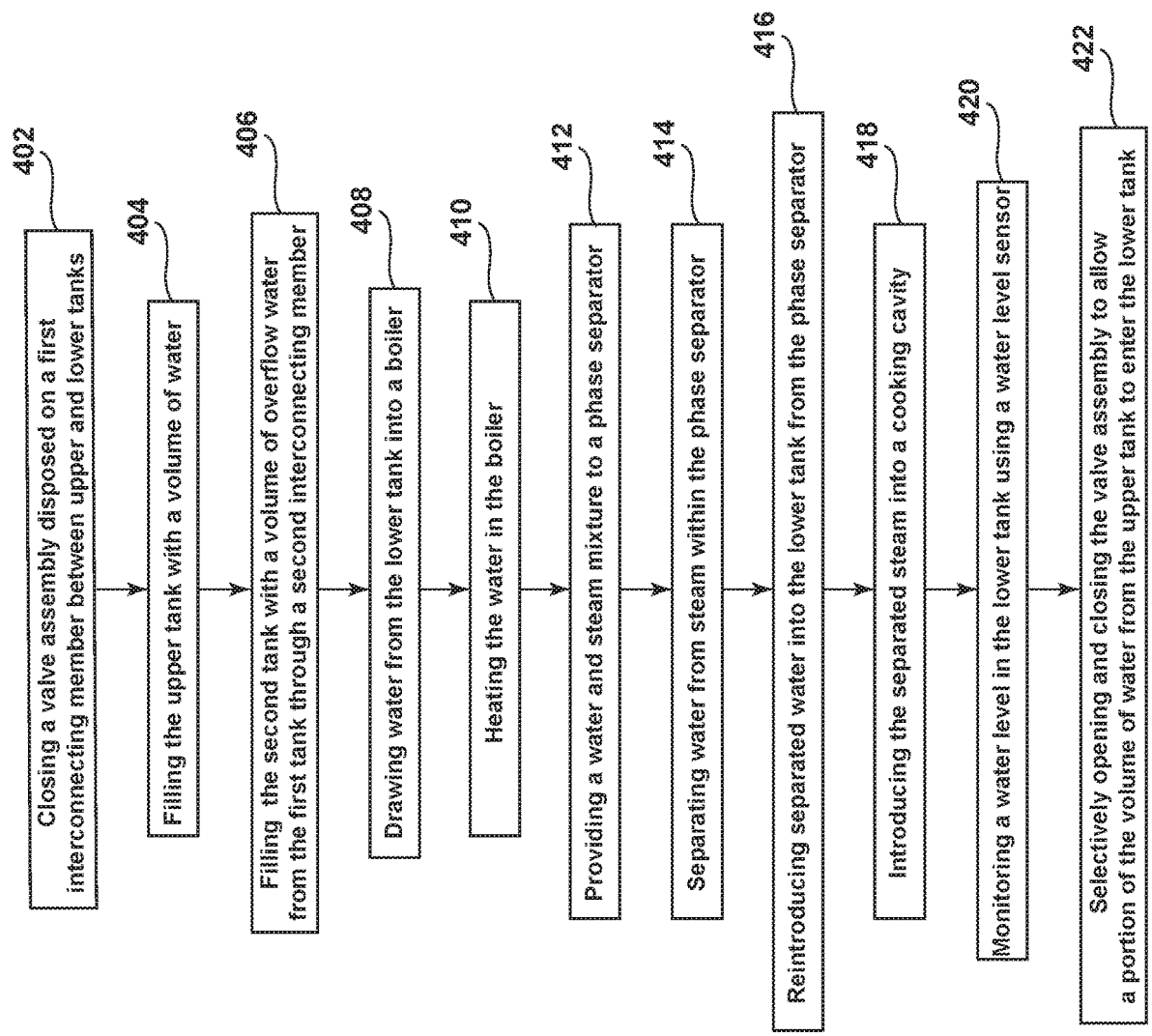
FIG. 29 is a flow chart diagram illustrating a method of filling a steam generating system and generating steam.

Referring now to FIG. 29, a method 400 of connecting a steam generating system, such as steam generating system 10 (FIGS. 3, 4), to a water source is shown. The steam generating system 10 of FIGS. 3 and 4 will be used as an exemplary system to describe the method 400 of connecting the same to a water source. The method 400 further includes the steps of generating steam using the water used to fill the steam generating system. In the method 400, an initial step 402 includes closing the valve assembly 24 between the upper tank 20 and the lower tank 22. As shown in FIGS. 3 and 4, the valve assembly 24 is disposed on interconnecting members 52, 54 which interconnect the upper tank 20 and the lower tank 22. The method further includes a filling step 404 that provides for filling the upper tank 20 with a volume of water. It is contemplated that upper tank 20 can hold approximately 1 liter of water. A filling step 406 of the method 400 provides for filling the lower tank 22 with a volume of overflow water from the first tank 20 through a second interconnecting member, such as interconnecting member 50. As noted above, with specific reference to FIG. 5, the filling step 406 of the lower tank 22 is provided after the upper tank 20 is filled with water from the inlet pump 32. With the upper tank 20 filled with water when the valve assembly 24 is closed, the volume of water within the upper tank 20 will eventually reach the upper water outlet 46 which is fluidically coupled to the lower tank 22 by interconnecting member 50. Without any valves or other hindrances along the interconnecting member 50, overflow water freely flows from the upper tank 20 to the lower tank 22 in a gravitational manner along interconnecting member 50 as the inlet pump 32 continues to provide water to the upper tank 20 beyond its fill capacity. Again the gravitational filling of the lower tank 22 is provided by the vertically offset positions of the upper tank 20 and the lower tank 22. It is contemplated that the lower tank 22 may also hold approximately 1 liter of water at fill capacity.

In step 408 of the method 400, water is drawn from the lower tank 22 into the boiler 26. The water within the boiler 26 is then heated in step 410. By heating the water in the boiler 26, a water and steam mixture rises through the vertically disposed boiler 26 and enters the phase separator 28 in step 412 of the method 400. In step 414 of the method 400, water and steam are separated from one another within the phase separator 28 in a manner as described above with reference to FIG. 8. In step 416 of the method 400, the separated water is reintroduced into the lower tank 22 from the phase separator 28. In step 418 of the method 400, the separated steam is introduced into a cooking cavity from the phase separator 28, such as cooking cavity 6 shown in FIG. 9. As a steam producing cycle is underway, a decreasing water level within the lower tank 22 is continually monitored using a water level sensor, such as water level sensor 90. It is contemplated that filling of the lower tank 22 will cease once the water level sensor 90 provides information to the controller 84 that the lower tank 22 is filled to capacity, or to another predesignated fill point. The water level sensor 90 continues to monitor the water level within the lower tank 22 during a steam generating process in step 420 of the method 400. When applicable, the water level sensor 90 may send a signal to a controller, such as the controller 84 discussed above, that the water level within the lower tank 22 has reached a threshold level wherein more water is required within the lower tank 22 to continue to generate steam for the cooking cavity 6. When such a signal is received by the controller 84, the controller 84 can control the valve assembly 24 to selectively open and close the valve assembly 24 to allow a portion of the volume of water stored within the upper tank 20 to enter the lower tank 22 via the interconnecting members 52, 54 in a gravitational manner. Thus, once the steam generating system 10 is in a filled condition, wherein both the upper tank 20 and the lower tank 22 are filled to capacity with water, the steam generating system 10 can continue to generate steam to a cooking cavity by first using the water within the lower tank 22, and then using water as needed from the upper tank 20, under the control of the controller 84 and the valve assembly 24, to refill the lower tank 22. As noted above, the lower tank 22 will also receive water from the phase separator 28 during the separation of water and steam within the phase separator 28 to partially replenish water drawn to the boiler 26 from the lower tank 22 in a steam generating process. As disclosed within the method 400, interconnecting members 52, 54 may be collectively described as a first in a connecting member, while interconnecting member 50 may be described as a second interconnecting member.

Figure 30:
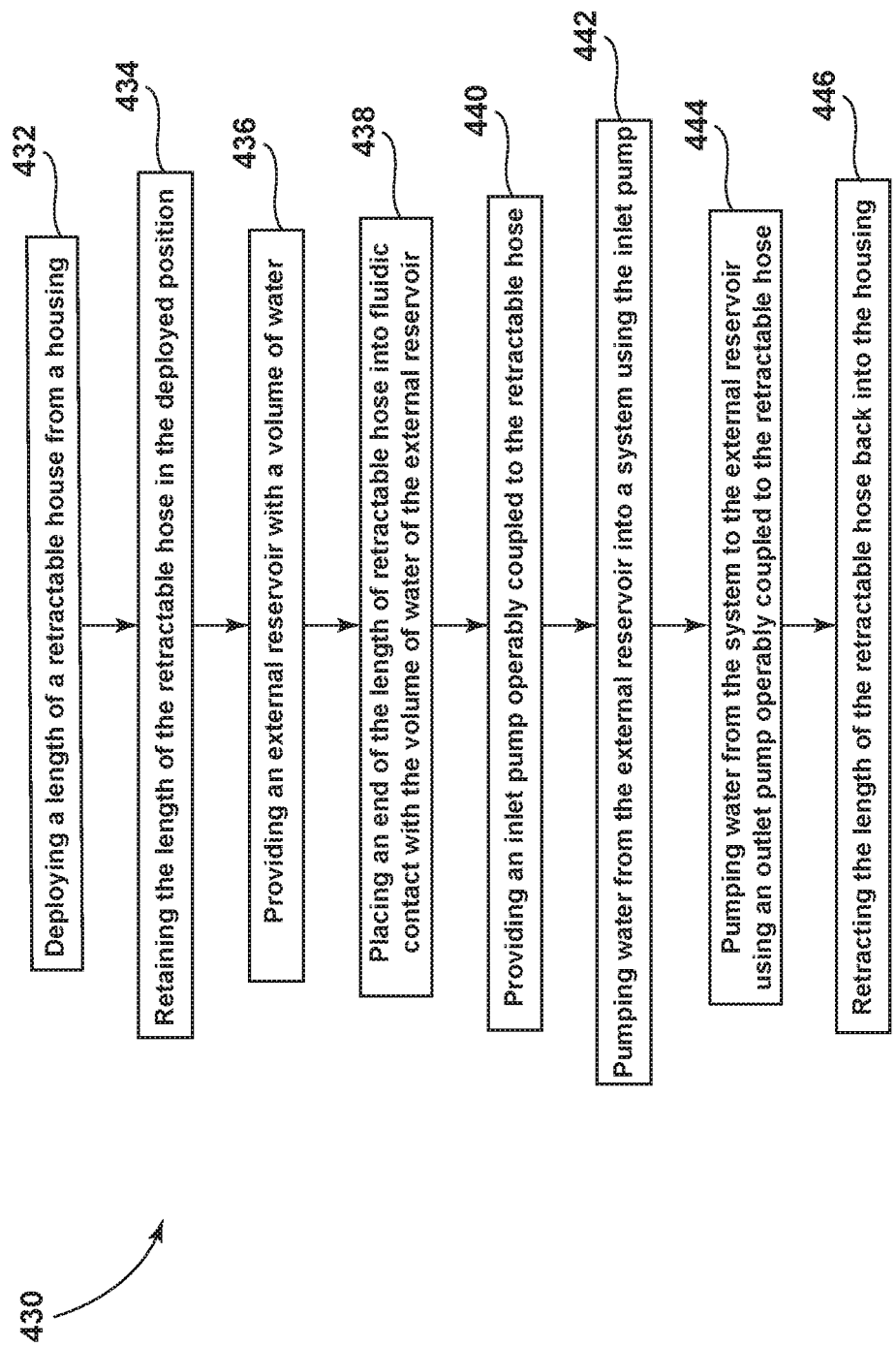
FIG. 30 is a flow chart diagram illustrating a method of connecting a steam generating system to a water source.

Referring now to FIG. 30, a method 430 of connecting an appliance to a water source is illustrated. The oven 2 shown in FIGS. 1 and 2 and the retractable hose 174 of FIGS. 15-18 will be used as exemplary components for the description of the method 430. In an initial step 432 of the method 430, a length of the retractable hose 174 is deployed from a housing 18A. The length of retractable hose 174 that is deployed from the housing 18A is retained in the deployed position in step 434 of the method 430. The length of retractable hose 174 may be retained in the deployed position using the push-push connector assembly 232 as described above. In step 436 of the method 430, an external reservoir is provided with a volume of water, such as external reservoir 180 shown in FIGS. 14A and 14B. In step 438 of the method 430, an end portion 172 of the length of retractable hose 174 is placed into fluidic contact with the volume of water of the external reservoir 180. In steps 440 and 442 of the method 430, an inlet pump, such as inlet pump 32, is provided and operably coupled to the retractable hose 174 (step 440) for pumping water from the external reservoir 180 into the steam generating system 10 (step 442).

Having used the retractable hose 174 to provide water to the steam generating system 10, the steam generating system 10 can generate steam for providing to the cooking cavity 6. When a steam generating cycle of the oven 2 is completed, an outlet pump, such as outlet pump 34, may be provided in fluidic communication with the steam generating system 10. As shown in FIG. 4, outlet pump 34 is operably coupled to the lower tank 22 by interconnecting member 80. In step 444 of the method 430, water is pumped from the steam generating system 10 to the external reservoir 180 through the retractable hose 174 using the outlet pump 34 which is operably coupled to the retractable hose 174. This step may not be necessary if all the water housed within the steam generating system 10 is used up in a steam generating procedure. In step 446 of the method 400, the length of the retractable hose 174 is retracted back into the housing 18A after the discharging of the water is complete.

Figure 31:
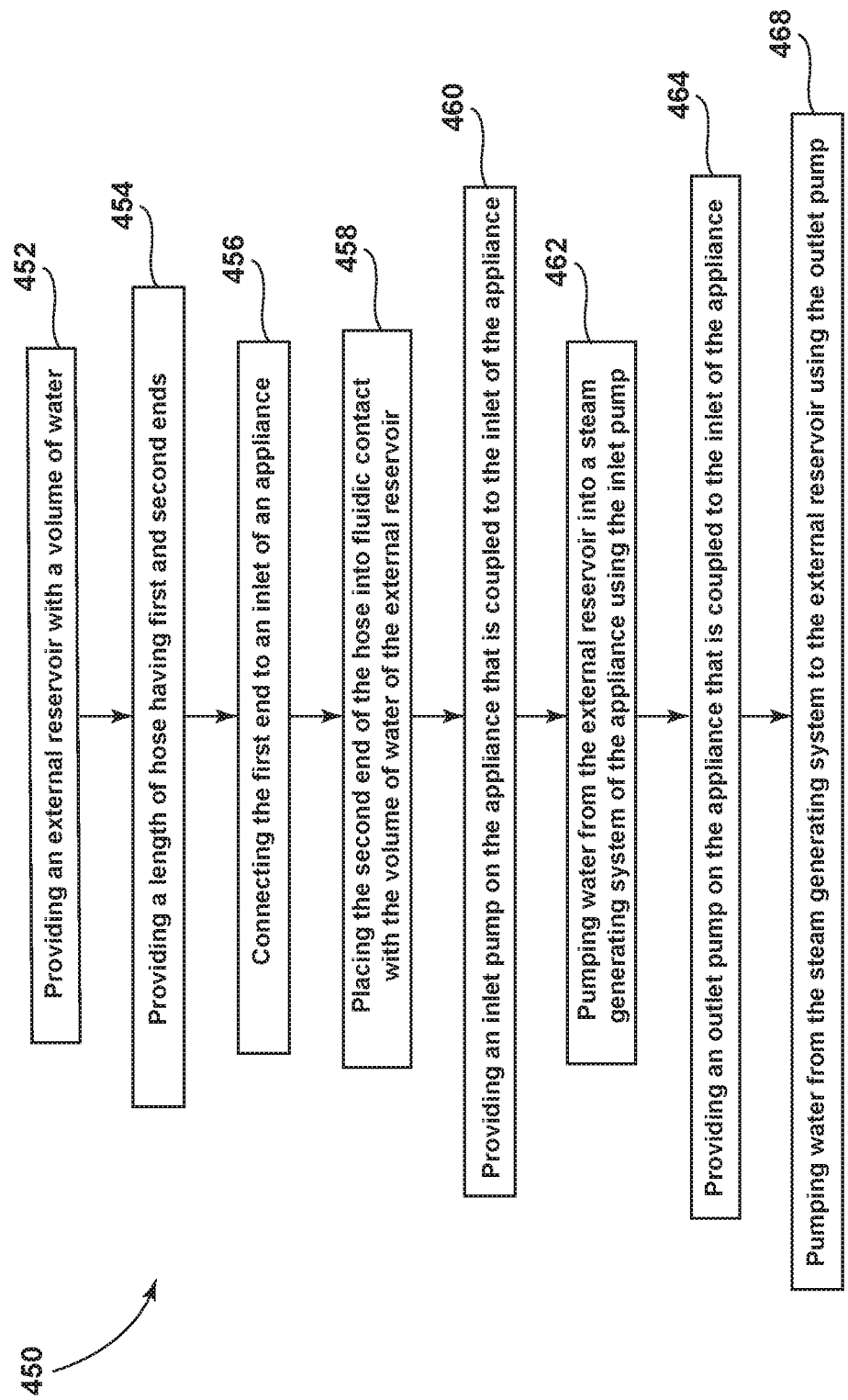
FIG. 31 is a flow chart diagram illustrating another method of connecting a steam generating system to a water source.

Referring now to FIG. 31, a method 450 of connecting an appliance to a water source is illustrated. The oven 2 shown in FIGS. 10 and 12F will be used as an exemplary appliance for the description of the method 450. In an initial step 452 of the method 450, external reservoir 180 is provided with a volume of water. In step 454 of the method 450, a hose or interconnecting member is provided having first and second ends. The hose may be akin to external hose 162 shown in FIG. 12A. In step 456 of the method 450, the first end 164 of the hose 162 is connected to an inlet of the oven 2, such as inlet 156. As noted above, this connection can be provided using a quick connect system, a threaded engagement, a friction fit connection, or other like connecting technique. In step 458 of the method 450, a second end of the hose 162 is contemplated to be a free end of the external hose 162 that can be positioned into fluidic contact with the volume of water of the external reservoir 180. In steps 460 and 462 of the method 450, an inlet pump, such as inlet pump 32, is provided and operably coupled to the inlet 156 of the oven 2 (step 460) for pumping water from the external reservoir 180 into the steam generating system 10 of the oven 2 (step 462) through the external hose 162. In step 464 of the method 450, an outlet pump, such as outlet pump 34 shown in FIG. 4, is provided on the oven 2 and is also operably coupled to the inlet 156 of the oven 2. In step 468 of the method 450, water is pumped from the steam generating system 10 to the external reservoir 180 using the outlet pump 34 and the interconnecting hose 162.

According to at least one aspect, a steam generating system for an appliance includes a first tank positioned at a first vertical position. The first tank includes an upper water outlet and a lower water outlet vertically offset from one another. A second tank is positioned at a second vertical position that is lower than the first vertical position of the first tank. The upper water outlet of the first tank that is fluidically coupled to the second tank by a first interconnecting member. The lower water outlet of the first tank is fluidically coupled to the second tank by a second interconnecting member. A valve assembly is disposed along the second interconnecting member and is operable between open and closed conditions to selectively provide access between the first tank and the second tank via the second interconnecting member.

According to another aspect, a boiler includes first and second ends. The first end of the boiler is operably coupled to a water outlet of the second tank.

According to another aspect, a phase separator includes an inlet operably coupled to and in fluid communication with the boiler at the second end of the boiler.

According to another aspect, the phase separator further includes a water outlet operably coupled to the second tank for reintroducing water that is not converted into steam back into the second tank.

According to another aspect, the phase separator further includes a steam outlet operably coupled to a steam supply tube. The steam supply tube is operably coupled to a cooking cavity of the appliance for delivering steam thereto.

According to another aspect, the phase separator further includes a pathway therethrough that is defined between the inlet of the phase separator and the steam outlet of the phase separator. The water outlet of the phase separator is disposed between the inlet of the phase separator and the steam outlet of the phase separator along the pathway.

According to yet another aspect, the water outlet and the inlet of the phase separator are disposed on a lower portion of the phase separator. The steam outlet of the phase separator is disposed on an upper portion of the phase separator.

According to at least one aspect, an appliance includes a chassis having an upper wall and a rear wall. A cooking cavity is at least partially surrounded by the chassis. A first tank is mounted on the upper wall of the chassis and includes an upper water outlet and a lower water outlet. A second tank is mounted on the rear wall of the chassis in a position that is vertically lower than a position of the first tank. The second tank includes first and second water inlets. The upper water outlet of the first tank is fluidically coupled to the first water inlet of the second tank. The lower water outlet of the first tank is fluidically coupled to the second water inlet of the second tank.

According to another aspect, an interconnecting member fluidically couples the lower water outlet of the first tank to the second water inlet of the second tank.

According to another aspect, a valve assembly is disposed along the interconnecting member fluidically coupling the lower water outlet of the first tank to the second water inlet of the second tank. The valve assembly is operable between open and closed conditions to selectively provide access between the first tank and the second tank.

According to another aspect, a second interconnecting member fluidically couples the upper water outlet of the first tank to the first water inlet of the second tank. The second interconnecting member is an open member.

According to another aspect, the upper water outlet of the first tank is disposed on an upper portion of the first tank. The first water inlet of the second tank is disposed on an upper portion of the second tank.

According to another aspect, a boiler includes first and second ends. The first end of the boiler is operably coupled to a water outlet disposed on a lower portion of the second tank.

According to another aspect, a phase separator includes an inlet operably coupled to and in fluid communication with the boiler at the second end of the boiler.

According to another aspect, the boiler is vertically disposed, such that the first end of the boiler is positioned below the second end of the boiler. The phase separator includes a water outlet disposed above and opening into a cavity of the second tank.

According to yet another aspect, the phase separator further includes a steam outlet operably coupled to a steam inlet. The steam inlet opens into the cooking cavity of the appliance for delivering steam thereto.

According to at least one aspect, a steam generating system for an appliance includes a first tank disposed at a first vertical position. The first tank includes a cavity with a first water outlet and a second water outlet. The second water outlet is positioned vertically below the first water outlet. A valve assembly is operable between open and closed conditions. A second tank is positioned at a second vertical position that is lower than the first vertical position of the first tank. The second tank includes first and second water inlets. The first water outlet of the first tank is fluidically coupled to the first water inlet of the second tank. The second water outlet of the first tank is fluidically coupled to the valve assembly that is further fluidically coupled to the second water inlet of the second tank.

According to another aspect, a water level sensor is disposed within the second tank for monitoring a water level within the second tank.

According to another aspect, the valve assembly is an electrovalve assembly operably coupled to and controlled by a controller. The controller is further operably coupled to the water level sensor for receiving data regarding the water level within the second tank.

According to another aspect, a boiler includes first and second ends. The first end of the boiler is operably coupled the second tank. A phase separator includes an inlet operably coupled to and in fluid communication with the boiler at the second end of the boiler. The phase separator further includes a water outlet opening into the second tank. The phase separator also includes a steam outlet for discharging steam therethrough.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A steam generating system for an appliance, comprising:
   a first tank positioned at a first vertical position, the first tank including an upper water outlet positioned above a lower water outlet, such that the upper water outlet and the lower water outlet are vertically offset from one another, and further wherein the first tank includes a water inlet;
   a second tank positioned at a second vertical position that is lower than the first vertical position of the first tank, wherein the second tank includes first and second water inlets positioned on an upper portion of the second tank, and first and second water outlets positioned on a lower portion of the second tank, wherein the upper water outlet of the first tank is fluidically coupled to the second water inlet of the second tank by a first interconnecting member, and further wherein the lower water outlet of the first tank is fluidically coupled to the first water inlet of the second tank by a second interconnecting member;
   a valve assembly disposed along the second interconnecting member, wherein the valve assembly is operable between open and closed conditions to selectively provide access between the first tank and the second tank via the second interconnecting member; and
   a pump, wherein the pump is fluidically coupled to the first water outlet of the second tank by an interconnecting member, and further wherein the pump is operably coupled to the water inlet of the first tank.

2. The steam generating system of claim 1, including;
   a boiler having first and second ends, wherein the first end of the boiler is operably coupled to the second water outlet of the second tank.

3. The steam generating system of claim 2, including;
   a phase separator having an inlet operably coupled to and in fluid communication with the boiler at the second end of the boiler.

4. The steam generating system of claim 3, wherein the phase separator further includes a water outlet operably coupled to the second tank for reintroducing water that is not converted into steam back into the second tank.

5. The steam generating system of claim 4, wherein the phase separator further includes a steam outlet operably coupled to a steam supply tube, and further wherein the steam supply tube is operably coupled to a cooking cavity of the appliance for delivering steam thereto.

6. The steam generating system of claim 5, wherein the phase separator further includes a pathway therethrough that is defined between the inlet of the phase separator and the steam outlet of the phase separator, wherein the water outlet of the phase separator is disposed between the inlet of the phase separator and the steam outlet of the phase separator along the pathway.

7. The steam generating system of claim 5, wherein the water outlet and the inlet of the phase separator are disposed on a lower portion of the phase separator, and further wherein the steam outlet of the phase separator is disposed on an upper portion of the phase separator.

* * * * *